United States Patent
Rastovich et al.

(10) Patent No.: US 8,818,834 B1
(45) Date of Patent: Aug. 26, 2014

(54) SYSTEM AND METHOD FOR AUTOMATED COMMUNITY SCHEDULE MANAGEMENT

(71) Applicants: Rob Rastovich, Bend, OR (US); David Ehrlich, San Francisco, CA (US); Mark Cashman, San Jose, CA (US); Suzanne Dryan Felson, San Francisco, CA (US); Rita Jenkins, San Francisco, CA (US)

(72) Inventors: Rob Rastovich, Bend, OR (US); David Ehrlich, San Francisco, CA (US); Mark Cashman, San Jose, CA (US); Suzanne Dryan Felson, San Francisco, CA (US); Rita Jenkins, San Francisco, CA (US)

(73) Assignee: Reso Holdings Inc., San Francisco, CA (US)

( * ) Notice: Subject to any disclaimer, the term of this patent is extended or adjusted under 35 U.S.C. 154(b) by 0 days.

(21) Appl. No.: 13/737,038

(22) Filed: Jan. 9, 2013

(51) Int. Cl.
*G06Q 10/00* (2012.01)
*G06Q 10/02* (2012.01)

(52) U.S. Cl.
CPC .................................... *G06Q 10/025* (2013.01)
USPC .................. 705/7.19; 705/5; 705/6; 705/7.18

(58) Field of Classification Search
CPC .......... G06Q 10/025; G06Q 10/06311; G06Q 10/02; G06Q 10/1093
USPC ........................................ 705/5, 6, 7.18, 7.19
See application file for complete search history.

(56) References Cited

U.S. PATENT DOCUMENTS

| | | | |
|---|---|---|---|
| 7,174,517 B2 | 2/2007 | Barnett et al. | 715/764 |
| 8,195,309 B2 | 6/2012 | Hegde et al. | 700/17 |
| 2003/0154116 A1 | 8/2003 | Lofton | 705/8 |
| 2004/0049424 A1* | 3/2004 | Murray et al. | 705/14 |
| 2004/0133440 A1 | 7/2004 | Carolan et al. | 705/1 |
| 2005/0049781 A1* | 3/2005 | Oesterling | 701/207 |
| 2006/0259353 A1* | 11/2006 | Gutmann | 705/13 |
| 2006/0293937 A1* | 12/2006 | Sohm et al. | 705/8 |
| 2008/0052162 A1 | 2/2008 | Wood | 705/14 |
| 2008/0098313 A1 | 4/2008 | Pollack | 715/753 |
| 2008/0162251 A1 | 7/2008 | Lee et al. | 705/9 |
| 2009/0055513 A1* | 2/2009 | Berry et al. | 709/219 |
| 2009/0177513 A1 | 7/2009 | Eckhart et al. | 705/8 |
| 2010/0082376 A1 | 4/2010 | Levitt | 705/7 |
| 2010/0269049 A1 | 10/2010 | Fearon | 715/744 |
| 2011/0055062 A1* | 3/2011 | Juntilla et al. | 705/34 |
| 2011/0066664 A1 | 3/2011 | Goldman et al. | 707/812 |
| 2011/0071865 A1 | 3/2011 | Leeds et al. | 705/6 |
| 2011/0313803 A1 | 12/2011 | Friend et al. | 705/7.13 |
| 2012/0164997 A1 | 6/2012 | Iyer | 455/414.2 |

OTHER PUBLICATIONS

Student Government Association Offers Carpool Option to Save Money, Environment to University of Texas-Pan American Community; Meeting Scheduled Nov. 25. US Fed News Service, Including US State News [Washington, D.C] Nov. 20, 2008.*

(Continued)

*Primary Examiner* — Timothy Padot
(74) *Attorney, Agent, or Firm* — Pillsbury Winthrop Shaw Pittman LLP

(57) ABSTRACT

A system and method for automated community schedule management, including registration, management, and sharing of activity, group, and carpool information for a community is provided. The system may enable a caregiver to register participants in one or more activities. The system and method may also enable one or more activity providers to register and administer one or more activities. The system may further enable a carpool creator to create and/or manage one or more carpools to activities and/or destinations and events separate from activities.

28 Claims, 10 Drawing Sheets

(56) References Cited

OTHER PUBLICATIONS

Captus Launches New Carpool Website; CarpoolMatchNW.org Designed to Match Carpool Partners. Business Editors. Business Wire [New York] Apr. 26, 2001: 1.*

-Student Government Association Offers Carpool Option to Save Money, Environment to University of Texas-Pan American Community; Meeting Scheduled Nov. 25. US Fed News Service, Including US State News [Washington, D.C] Nov. 20, 2008.*

Website Launches for Carpool/Ride Share Programs. US Fed News Service, Including US State News [Washington, D.C] Sep. 24, 2008.*

* cited by examiner

SYSTEM AND METHOD FOR AUTOMATED COMMUNITY SCHEDULE MANAGEMENT

FIELD OF THE INVENTION

The invention relates to a system and method for automated community schedule management, including registration, management, and sharing of activity, group, and carpool information for a community.

BACKGROUND OF THE INVENTION

In many instances, a family's activities are individually scheduled with respective activity providers. For example, a caregiver (e.g., a mother, father, guardian, and/or other person with a role of responsibility in or for a family) may have to register, at a plurality of web sites and/or with a plurality of activity providers, to participate in activities for herself and/or for her family members. Caregivers may also have to individually track the activities in which she and her family members participate. For example, an activity may have one or more classes a week, with the activity spanning multiple weeks. A caregiver may therefore have to schedule and keep track of the days and weeks during which an activity occurs for each activity in which she or a family member participates, along with logistics associated with each such activity.

A caregiver may also have to organize transportation for activity participants (including, for example, the caregiver and caregiver's family members) to attend activities. For example, the caregiver may have to organize and manage one or more carpools relating to one or more activities in which the caregiver and/or her family members participate.

Conventional automated scheduling tools exist, but have various limitations and drawbacks. For example, conventional automated scheduling systems may are limited to activity registration functionality and/or maintenance of a calendar. These and other drawbacks.

SUMMARY OF THE INVENTION

The invention solving these and other drawbacks relates to a system and method for automated community schedule management, including registration, management, and sharing of activity, group, and carpool information.

According to an aspect of the invention, the system may enable a caregiver to register participants in one or more activities. For example, the caregiver may register himself or herself and/or one or more contacts (for whom the caregiver may schedule activities) as participants of an activity. A contact of the caregiver may be, for example, a family member of the caregiver, a friend of the caregiver, a friend of a family member of the caregiver, a group of one or more family members and/or friends, an organization, an entity, and/or other contact.

The system and method may also enable one or more activity providers to register and administer one or more activities. Activity providers may include, for example, administrators of an activity, teachers, volunteers involved with an activity, and/or other persons with a role of responsibility related to an activity being provided.

As used herein, an activity may include an event in which one or more participants may participate. Types of activities may include, for example, sports, extracurricular classes, clubs, groups, organizations, affiliations, community organizations, educational activities, and/or other activity types. The activities registered with the system are not limited to the examples described herein.

According to an aspect of the invention, the system may enable a carpool creator to create and/or manage one or more carpools. A carpool may comprise one or more carpool instances. A carpool instance may relate to a single transportation of one or more passengers. A carpool may comprise one or more recurring carpool instances. A carpool may enable one or more passengers to be transported to and from an activity. In some implementations, a carpool may also enable one or more passengers to be transported to destinations and/or events separate from the activities. Drivers and passengers may be matched to a carpool and/or carpool instance.

According to one implementation, the system may comprise one or more computing devices (e.g., one or more servers) including one or more processors configured to perform some or all of a functionality of a plurality of modules. In some implementations, a computing device may comprise a non-transitory, tangible computer-readable storage medium with an executable program stored thereon, wherein the program instructs a microprocessor to perform some or all of the functionality of the plurality of modules. The system may be accessed, for example, via one or more interfaces (e.g., web pages) communicated from the computing device to a client, as an application such as a mobile application executing on a client that generates the interface based on information communicated from the computing device, an agent running on the computing device, and/or via other interfaces.

The plurality of modules of the system may include, for example, a registration module, a provider registration module, a role-based permissions module, an activity management module, a carpool management module, a group management module, a content sharing module, a storage module, a reporting module, a transaction management module, and/or other modules.

The registration module may be configured to enable a caregiver to register with the system and associate one or more contacts with the caregiver.

The provider registration module may be configured to enable an activity provider to register with the system and associate one or more activities and/or activity schedules with the activity provider.

The role-based permission module may be configured to tailor access to the system based on roles of various users including, for example, a role in the system, role for an activity, role for a class, role in a carpool, and/or other roles.

The activity management module may enable caregivers and/or activity providers to create, view and/or register activities.

The carpool management module may be configured to create and manage one or more carpools. For example, the carpool management module may enable creation of one or more carpools, creation of one or more carpool instances for a carpool, viewing of one or more carpools, enabling drivers to register for one or more carpool, enabling drivers to register for one or more carpool instances, matching passengers to one or more carpools, matching passengers to one or more carpool instances, and/or other functionality related to the creation and management of a carpool.

The group management module may be configured to create and/or manage one or more groups. A group may be created to enable members of the group to share content. Groups may include one or more group members associated with, for example, an activity, a class, a carpool, a carpool instance, a location, and/or other types of associations.

The content sharing module may be configured to share caregiver content, activity content, group content, carpool content, and/or other content, as described herein.

The storage module may be configured to store information related to system usage, caregiver content, activity content, group content, carpool content, and/or other content.

The reporting module may be configured to facilitate analysis and report information related to system usage, caregiver content, activity content, group content, carpool content, and/or other content.

The transaction management module may be configured to track transactions relating to activity providers, caregivers, and/or other users of the system.

Registration Module

In some implementations, the registration module may comprise one or more modules, including, for example, a caregiver registration module and a contact registration module. The caregiver registration module may enable a caregiver to register with the system. The contact registration module may enable a caregiver to register and associate one or more contacts of the caregiver.

In some implementations, the caregiver registration module may accept and store profile information for a caregiver. Profile information for a caregiver may include, for example, contact information for the caregiver, demographic information for the caregiver, calendar information for the caregiver, role-based information for the caregiver, activities associated with the caregiver, carpools associated with the caregiver, one or more contacts associated with the caregiver, activities and/or carpools associated with contacts associated with the caregiver, and/or other information.

Calendar information for a caregiver may include, for example, a schedule of the caregiver, one or more schedules for one or more contacts associated with the caregiver, one or more schedules of activities associated with the caregiver, one or more schedules of activities associated with one or more contacts associated with the caregiver, one or more schedules of carpools, one or more schedules of carpool instances associated with the caregiver, one or more schedules of carpool instances associated with contacts associated with the caregiver, and/or other calendar information.

In some implementations, a system calendar may be maintained for a caregiver. The system calendar may be synched with one or more commercially available calendars, contacts, or other software programs of the caregiver, including, for example, MICROSOFT OUTLOOK, GOOGLE Calendars, FACEBOOK Events, and/or other commercially available calendar software. Additionally, one or more commercially available calendars of contacts of the caregiver may be associated with the system calendar of the caregiver as well. In some implementations, when one or more of the activity management module, the carpool management module, the group management module, and/or other modules update a calendar of the caregiver, one or more other calendars of the caregiver may also be updated.

In some implementations, the contact registration module may enable a caregiver to manage and associate contacts with the caregiver. For example, the contact registration module may enable a caregiver to add, modify and/or delete from a caregiver profile. The contact registration module may also enable a caregiver to manage one or more contact's access to caregiver content, a caregiver's profile, content associated with the contact, and/or other content.

In some implementations, the contact registration module may also enable a caregiver to create a profile for a contact. A contact profile may include, for example, personal information of the contact, access restrictions by caregiver, and/or other contact profile content.

In some implementations, the contact registration module may enable a caregiver to identify one or more contacts as a joint caregiver. A joint caregiver may have the same access and roles as a caregiver in the system. For example, a joint caregiver may be a life partner, relative, spouse of the caregiver, and/or other contact chosen by the caregiver. A joint caregiver may also be, for example, a parent and/or guardian of a contact of the caregiver.

In some implementations, the contact registration module may enable a caregiver to identify one or more contacts as a joint caregiver for one or more identified contacts. For example, the joint caregiver may have the same access and roles as a caregiver with respect to the one or more identified contacts.

Provider Registration Module

The provider registration module may enable an activity provider to register with the system, and to associate one or more activities and activity schedules with the activity provider. In some implementations, the provider registration module may accept and store profile information for an activity provider. Profile information for an activity provider may include, for example, contact information for the activity provider, calendar information for the activity provider, contacts associated with the activity provider, role-based information for the activity provider, role-based information for contacts associated with the activity provider, one or more activities associated with the activity provider, and/or other profile information.

In some implementations, the provider registration module may accept and store registration information for an activity from an activity provider. Activity registration information may include, for example, description information about the activity, administrators associated with the activity, one or more types of classes associated with the activity, a description of the one or more types of classes associated with the activity, instructors associated with one or more classes, schedules associated with the activity, schedules associated with one or more classes of the activity, one or more time periods during which the activity occurs, dates and times during which one or more classes of the activity occurs in a time period, a maximum number of participants for the activity, a maximum number of participants for one or more classes of the activity, requirements for participants of the activity, a waitlist for one or more classes, and/or other activity registration information. Requirements for participants of the activity may include, for example, required and/or requested experience (e.g., having taken one or more prerequisite classes, having passed one or more tests, and/or other experiences), an age range, gender, location, skill level, any combination thereof, and/or other requirements.

In some implementations, the provider registration module may enable an activity provider to identify one or more contacts as a proxy activity provider. A proxy activity provider may have a same access and roles as an activity provider in the system. For example, a proxy activity provider may be an administrator of an activity associated with the activity provider, an instructor of an activity associated with the activity provider, an instructor of a class associated with the activity provider, and/or other contact chosen by the activity provider.

In some implementations, the provider registration module may enable an activity provider to identify one or more contacts as a proxy activity provider with respect to one or more activities and/or one or more classes associated with an activity. For example, the proxy activity provider may have a same access and roles as an activity provider with respect to identified classes.

The provider registration module may also facilitate creation of a profile for a proxy activity provider. A proxy activity provider profile may include, for example, personal information of the proxy activity provider, access restrictions by proxy activity provider, and/or other information.

Role-Based Permission Module

The role-based permission module may be configured to tailor access to the system based on roles of various users including, for example, a role in the system, role for an activity, role for a class, role in a carpool, and/or other role. For a caregiver, as an example, access may include access to one or more modules, access to caregiver content stored at a storage module, access to activity content associated with the caregiver, access to activity content associated with one or more contacts of the caregiver, and/or other access. Access for an activity provider may include, for example, access to one or more modules, access to activity content stored at a storage module, access to caregiver content associated with activities associated with the activity provider, and/or other access. The role-based permissions module may maintain a plurality of roles, including, for example, caregiver, activity provider, contact, participant, administrator, proxy activity provider, joint caregiver, carpool driver, passenger, and/or other roles.

Activity Management Module

The activity management module may enable caregivers and/or activity providers to create, view and/or register activities. In some implementations, the activity management module may comprise one or more modules including, for example, an activity creation module, an activity view module, an activity participant registration module, and/or other modules for managing activities.

The activity creation module may enable an activity provider to create one or more activities, and to create one or more classes associated with an activity. In some implementations, the activity creation module may accept and store activity registration information for an activity from an activity provider.

The activity view module may facilitate the display of one or more activities from one or more activity providers. The activity view module may also display one or more lists of activities including, for example, new activities, activities registered during one or more date ranges, activities by activity provider, activities by type, activities by location, activities by time and location of one or more classes, activities in which space is available for participants, and/or other lists of activities displayed.

The activity view module may also facilitate access to activities of a specific type. In some implementations, a caregiver, for example, may search for a specific activity or a type of activity using one or more criteria. The criteria may include, for example, new activities, activities registered during one or more date ranges, activities by activity provider, activities by type, activities by location, activities by time and location of one or more classes, activities in which space is available for participants, and/or other criteria.

The activity participant registration module may enable a caregiver to register and manage one or more contacts of the caregiver as a participant of an activity and/or one or more classes of an activity. For example, the activity participant registration module may enable a caregiver to add, modify and/or delete a participant from an activity and/or one or more classes associated with an activity. The activity participant registration module may also determine whether a participant meet requirements for an activity and/or for a class based on, for example, registration information for the activity. The activity participant registration module may also facilitate the inclusion of a class schedule on a calendar of the caregiver.

Carpool Management Module

According to one aspect of the invention, the carpool management module may be configured to enable a carpool creator to for example, create one or more carpools, create one or more carpool instances for a carpool, view one or more carpools, facilitate the registration of drivers for one or more carpools, match passengers to one or more carpools, and/or engage in other carpool creation or management activity.

A carpool may be comprised of one or more carpool instances, where a carpool instance may comprise a single instance of transportation from an origination point to a destination for one or more drivers and one or more passengers. Carpool destinations may include, for example, one or more activities, one or more classes, one or more other events, and/or other destinations.

The carpool management module may comprise one or more modules, such as, for example, a carpool creation module, a carpool view module, a carpool registration module, a carpool matching module, and/or other modules for carpool management.

The carpool creation module may facilitate the creation of one or more carpools and/or one or more carpool instances. In some implementations, the carpool creation module may enable a carpool creator to create one or more carpools, with each carpool comprising one or more carpool instances. A carpool creator may be a caregiver, an activity provider, a contact of a caregiver, a contact of an activity provider, and/or other individual.

In some implementations, the carpool creation module may accept and store carpool information for a carpool and/or a carpool instance from a carpool creator. Carpool information may include, for example, a carpool creator, a carpool identifier, a destination, origination point, description information about the carpool, one or more types of carpools, a description of the one or more types of carpool, a time period during which a carpool occurs, dates and times during which a carpool occurs, one or more drivers for a carpool, one or more passengers for a carpool, one or more preferred passengers for a carpool, a maximum number of passengers for a carpool, requirements for passengers in a carpool, requirements for drivers in a carpool, a waitlist for one or more carpools, and/or other carpool information.

A carpool identifier may comprise a unique name that identifies a carpool. The carpool identifier may be random, or based on one or more pieces of carpool information, including, for example, destination, origination point, driver, time, date, type of car, date, preferred passengers, mid-route stops, availability, any combination thereof, and/or other identifiers related to a carpool.

Driver requirements may include, for example, age range of the driver, type of vehicle being driven by the driver, preferred passengers of the driver, number of passengers the driver is able to transport, equipment to be transported, storage capability of the driver's vehicle, minimum safety record for the driver, one or more types of insurance for the driver, liability waivers by the driver, liability waivers of one or more preferred passengers of the driver, and/or other driver requirements.

The carpool view module may display one or more lists of carpools and/or carpool instances. For example, carpools displayed in a list may include carpools that meet one or more carpool criteria associated with the list. Carpool criteria may include, for example, one or more items of carpool information such as destination, time, and date, newly created carpools, carpools created during a specific date and/or time range, carpools in which space is available for passengers, carpools for which a driver is not available, carpools for which a driver is available, and/or other criteria. The carpool view module may also facilitate the display of carpool information.

The carpool view module may also enable a search for one or more carpools and/or one or more carpool instances. For example, the carpool view module may enable a caregiver to search for a specific carpool, search for a specific carpool instance, and/or search for carpools and/or carpool instances meeting one or more of the carpool criteria.

The carpool registration module may facilitate the registration of one or more drivers for one or more carpools and/or one or more carpool instances. In some implementations, the carpool registration module may accept and store driver profile information for one or more drivers. The driver profile information may be accepted and stored from a carpool creator, a driver, from a caregiver, and/or from an activity provider.

A driver may be, for example, a caregiver, a contact associated with a caregiver, an activity provider, a contact associated with an activity provider, and/or other person associated with a caregiver or activity provider. Driver profile information may include, for example, personal information about the driver, whether the driver is a caregiver, whether the driver is an activity provider, one or more preferred passengers of the driver, one or more preferred routes, one or more activities associated with the driver, one or more classes associated with the driver, one or more carpools associated with the driver, one or more carpool instances associated with the driver, one or more origination points, one or more potential mid-route stops, one or more vehicles driven by the driver, storage capability of the one or more vehicles of the driver, insurance of the driver, and/or other driver profile information.

The carpool registration module may also accept and store passenger profile information for one or more passengers for one or more carpools and/or carpool instances. For example, the carpool registration module may accept and store passenger profile information from a passenger, a caregiver associated with a passenger, an activity provider associated with an activity in which the passenger is a participant, and/or other person associated with the passenger.

A passenger may be a person to be transported using the carpool. A passenger may be, for example, a caregiver, a contact associated with a caregiver, an activity provider, a contact associated with the activity provider, and/or other person who desires transportation using the carpool. Passenger profile information may include, for example, personal information about the passenger, emergency contact information for the passenger, whether the passenger is able to drive, equipment that the passenger may carry, allergies and/or other safety information about the passenger, one or more preferred routes of the passenger, one or more activities associated with the passenger, one or more classes associated with the passenger, one or more other passengers associated with the passenger, one or more origination points, and/or other passenger profile information.

In some implementations, the carpool registration module may facilitate the addition, modification and/or deletion of a driver for a carpool and/or a carpool instance. The carpool registration may also facilitate the addition, modification, and/or deletion of a passenger of a carpool and/or a carpool instance.

The carpool registration module may also determine whether a driver meets requirements for a carpool and/or carpool instance based on, for example, driver requirements associated with the carpool and/or the carpool instance.

The carpool registration module may also facilitate the inclusion of a schedule on a calendar of persons associated with the carpool. For example, the carpool registration module may enable a calendar of a caregiver of a passenger in a carpool instance to be updated with a schedule associated with the carpool instance. The calendar of a driver of a carpool and/or a carpool instance may also be updated. When the carpool is associated with an activity, a system calendar associated with the activity may also be updated.

The carpool matching module may match drivers and/or passengers to a carpool. In some implementations, the carpool matching module may match drivers and/or passengers to a carpool and/or carpool instance. For example, the carpool matching module may determine the allocation of one or more carpool instances of a carpool to one or more registered drivers by one or more allocation methods and by using one or more criteria. The criteria may include, for example, load balancing, preference of drivers based on registration date of the driver, driver preference based on other criteria, destination, origination point, mid-route stops of a driver, preferred passengers for a driver, number of passengers along a driving route for a driver, schedules of one or more drivers, manual allocation by a carpool creator, manual allocation by or more drivers, manual allocation by an activity provider, a combination thereof, and/or other criteria.

In some implementations, the carpool matching module may indicate when a carpool and/or carpool instance has not been allocated a driver. The carpool matching module may also indicate when a carpool and/or carpool instance has been allocated a driver but does not include any passengers or has available space for one or more passengers.

The carpool matching module may also notify a driver matched to a carpool and/or a carpool instance of the match. The carpool matching module may further remind a driver matched to a carpool and/or a carpool instance of the driver's duty to drive. For example, the carpool matching module may send a notification to a driver a predetermined time before the carpool instance to which the driver is matched is to begin. The notification may comprise, for example, a text message, an email, a phone call, and/or other type of alert to notify the driver. The driver may receive the notification one day before the carpool instance is to begin, six hours before, one hour before, and/or any other predetermined amount of time before the carpool instance is to begin.

Group Management Module

The group management module may be configured to enable one or more group administrators to create and/or manage one or more groups. The one or more group administrators may include, for example, one or more caregivers, contacts, activity providers, participants, drivers, passengers, and/or other persons who may create and manage a group.

In some implementations, one or more types of groups may be created. Group types may include, for example, groups including persons invited by one or more group administrators, groups associated with an activity, groups associated with one or more classes, groups associated with one or more carpools, groups associated with one or more carpool instances, groups associated with a certain location, and/or other types of groups.

The group management module may enable one or more group administrators to invite, modify, and/or delete group members of a group. Group members may include the one or more group administrators and persons invited by one or more group administrators. For example, the group management module may enable a group administrator to send an invitation to a potential group member to join a group. The potential group member may decline the invitation or may accept the invitation and be included as a group member of the group.

The group management module may also facilitate the management of a group member's access to group content, a group profile, and/or other content associated with a group. In some implementations, group members may be able to invite another group member to join the group.

In some implementations, the group management module may comprise one or more modules such as, for example, a group creation module, a group view module, a group sharing module, and/or other modules.

In some implementations, the group creation module may enable a group administrator to create one or more groups. For example, the group creation module may accept and store group profile information from one or more group administrators. Group profile information may include, for example, one or more group administrators, one or more group members, a description of the group, requirements for group members, access restrictions to group content, and/or other group profile information.

The group view module may facilitate the display of one or more groups and/or group content. The group view module may also display one or more lists of groups that meet one or more group criteria associated with the list. Group criteria may include, for example, new groups, groups created during one or more date ranges, groups by group administrator, groups by activity, groups by class, groups by carpool, groups by carpool instance, groups by type, groups by location, groups by time and location of one or more classes, groups in which new members are invited, and/or other types of group displayed.

The group view module may also enable a search for one or more groups. For example, the group view module may enable a caregiver or other user to search for a specific group, search for a specific type of group, and/or search for groups based on one or more group criteria.

In some implementations, the group view module may also facilitate the display of some or all group content of a group when displaying group information for a group.

The group sharing module may enable group members to share group content and/or group profile information. The group sharing module may enable group members to share group content and/or group profile information. In some implementations, one or more group administrators may set restrictions as to who may provide content to the group. Group content may include, for example, an identification of a content provider such as a group member, and information provided by the content provider.

Some or all group members may provide content to the group. In some implementations, only group administrators may provide content to the group. Group administrators may also select one or more group members who may also provide content to the group. In some implementations, any group member may provide content to the group.

When content is provided to a group, that content may be made available (e.g., by displaying the content) to some or all group members. For example, group content may only be made available to group administrators. Group administrators may then provide the content to some or all group members. In some implementations, group content may be provided to only one or more group administrators and/or group member of the content provider's choosing.

The group sharing module may further enable one or more group members to share group content. In some implementations, one or more group administrators may set restrictions as to who may share group content and/or with whom group content may be shared. For example, only group administrators may share group content with persons outside the group. In another example, group administrators may select one or more group members who may also share group content. In another example, any group member may share group content.

When a group member provides an item of group content, the group member may also provide one or more content identifiers that may be associated and/or included with the item of group content. A content identifier may include, for example, a contact, activity provider, caregiver, group, carpool, carpool instance, activity, class, location, date, time, and/or other identifiers related to an item of content.

In some implementations, the group sharing module may enable a group member to tag or link an entity (e.g., people, places, locations, and/or other entities) to an item of group content. One or more social media platforms with which a group member may be associated may search for the tagged entity and may present potential entities that match the tagged entity to the group member. The group sharing module may facilitate the sharing of the item of group content with the tagged entity. For example, the group sharing module may enable a group member to tag a FACEBOOK friend to an item of content. The group sharing module may facilitate the sharing of the item of content on FACEBOOK with the FACEBOOK friend tagged to the item of content. For example, the group sharing module may facilitate a posting of the item of content on a wall of the FACEBOOK friend tagged to the item of content.

Group content may be shared via one or more sharing methods. The media by which group content is shared may include, for example, video, text, picture, link, tag, TWEET, social media post, blog post, re-sharing of the related information via social media, a combination thereof, and/or any other media.

The group sharing module may also be configured to enable a group member or person with whom the group content is shared to share additional information in response to receiving the shared group content. The medium by which the additional information is shared may include, for example, video, text, picture, link, tag, TWEET, re-sharing of the additional information via social media, a combination thereof, and/or any other media.

Content Sharing Module

The content sharing module may be configured to share content such as, for example, caregiver content, activity content, carpool content, group content, and/or other content. In some implementations, some or all of an item of content may be shared. An item of content may include, for example, an identification of a content provider that provided the item of content, and any information provided by the content provider. The content provider may also provide one or more content identifiers that may be associated with an item of content.

The content sharing module may also restrict access and/or sharing of content. For example, the content sharing module may allow a content provider to select which portions of an item of content are shared. The content provider may also identify persons such as contacts, caregivers, and/or activity providers with whom the selected portions of the item are shared. In another example, the content sharing module may facilitate the sharing of a caregiver's calendar with one or more contacts.

In some implementations, the content sharing module may facilitate the sharing of content over one or more social media platforms. For example, one or more items of content may be linked or shared via social media platforms based on one or more content identifiers in the items. In another example, the content sharing module may facilitate the tagging or linking of entities (e.g. people, places, locations, and/or other entities) to an item of content. The tagged or linked entity may be registered with the system or may be separate from the system. The item of content may be shared with the tagged or linked entity.

When the tagged or linked entity is separate from the system, one or more social media platforms associated with the content provider of the item of content may search for the entity and may present potential entities that match the tagged or linked entity to the caregiver. The content sharing module may facilitate the sharing of the item of content with the tagged or linked entity. For example, the content sharing module may enable a content provider to tag a FACEBOOK friend to an item of content. The content sharing module may facilitate the sharing of the item of content on Facebook with the FACEBOOK friend tagged to the item of content. For example, the content sharing module may facilitate a posting of the item of content on a wall of the FACEBOOK friend tagged to the item of content.

Storage Module

The storage module may be configured to store information related to system usage, caregiver content, activity content, group content, carpool content, and/or other content. The storage module may further store any content developed and/or shared via the system.

Reporting Module

The reporting module may be configured to facilitate analysis of (and report information related to) system usage, caregiver content, activity content, carpool content, group content, and/or other content. The reporting module may also be configured to produce statistics regarding content and/or sharing of content. The reporting module may also be configured to prepare and/or display reports including one or more parts of the shared content and any statistics regarding shared content.

Additionally, the reporting module may be configured to maintain information related to an activity provider and/or related to an activity provider's role. For example, the reporting module may prepare a report describing participation over a certain period of time in an activity and/or one or more classes of an activity provider. The reporting module may also be configured to prepare analyses and/or reports relating to a number of transactions involving the activity provider, month-to-month trends regarding registration for activities associated with an activity provider, email status reports regarding one or more areas of activity management, and/or other information related to the activity provider.

The reporting module may also be configured to maintain information related to a carpool and/or carpool instance. For example, the reporting module may prepare a report describing driver statistics related to a car pool. Driver statistics may relate, for example, to timeliness of a driver, reliability of a driver, availability of a driver, safety of a driver, and/or other driver statistics.

Transaction Management Module

The transaction management module may be configured to track transactions relating to caregivers, activity providers, and/or other users of the system.

With respect to caregivers, the transaction management module may track the registration of a caregiver with the system, the association of contacts with the caregiver, the registration, by a caregiver, of a participant for an activity, and/or other functionality in which a caregiver may engage. The transaction management module may enable the caregiver to register an unlimited number of participants with an unlimited number of activities for the year when the caregiver pays an annual fee for registration. Alternatively, the system may enable a caregiver to pay an annual fee to access the system and a registration fee each time the caregiver registers a participant in an activity. Other business models to generate revenue from a caregiver may be implemented as well.

With respect to activity providers, the transaction management module may track the registration of an activity provider with the system, the creation of an activity by an activity provider, the registration of participants in an activity associated with the activity provider, and/or other functionality in which an activity provider may engage. The transaction management module may require an activity provider to pay an annual fee to access the system, a participant registration fee each time a participant registers for an activity associated with the activity provider, an activity registration fee for each activity that the activity provider creates, any combination thereof, and/or other fees. Other business models to generate revenue from an activity provider may be implemented as well.

The transaction management module may further be configured to manage a provision of advertisements at the system. The transaction management module may provide one or more types of advertising to users of the system, including, for example, a featured advertisement centrally located on a home page of a website via which the system may be accessed, a banner advertisement that may displayed on the home page or another page of the website, and/or other types of advertisements. A user such as an activity provider and/or group member may pay an advertising fee to purchase a featured advertisement, banner advertisement, and/or other type of advertisement. The advertising fee may vary based on, for example, the type of advertisement purchased, an amount of time that the advertisement will be available on the system, a size of the advertisement, a number of advertisements purchased by the user, and/or other information associated with the advertisement purchase. Other methods of generating revenue may also be implemented.

The transaction management module may further include the appropriate functionality for receiving and processing payments from users including, for example, credit card payments, payments via third parties such as PAYPAL, electronic check processing, and/or other types of payments.

Other objects and advantages of the invention will be apparent to those skilled in the art based on the following drawings and detailed description.

DETAILED DESCRIPTION

Figure 1:
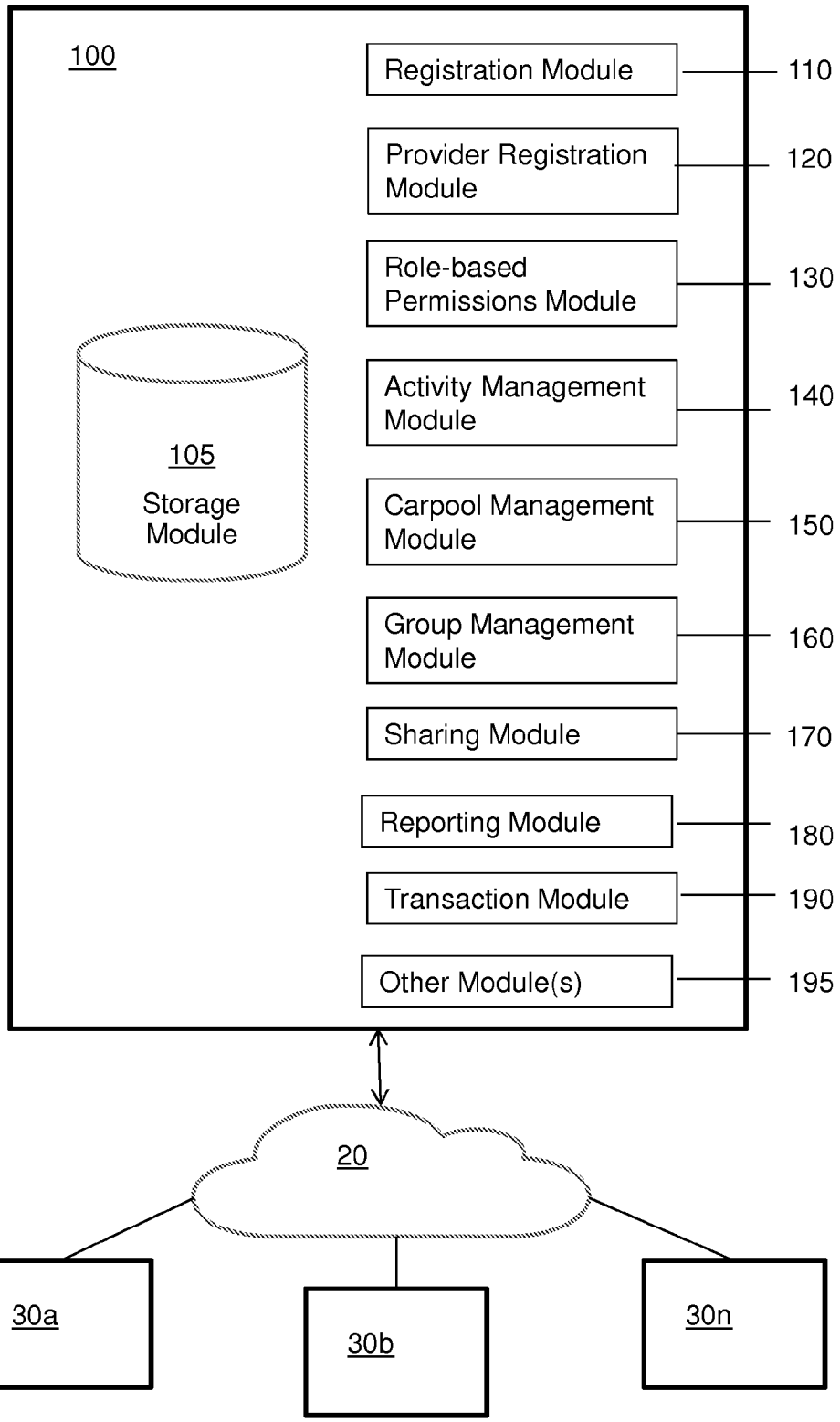
FIG. 1 illustrates a block diagram of an exemplary system for automated community schedule management, including registration, management, and sharing of activity, group, and carpool information, according to an aspect of the invention.

FIG. 1 illustrates an exemplary diagram of system 10 for automated community schedule management including registration, management, and sharing of activity, group, and carpool information, according to an implementation of the invention. System 10 may, for example, comprise network 20, one or more computing devices 100, and one or more client devices 30a, 30b, . . . , 30n.

Computing device 100 may include one or more processors configured to perform some or all of a functionality of a plurality of modules. In some implementations, computing device 100 may comprise a non-transitory, tangible computer-readable storage medium with an executable program stored thereon, wherein the program instructs a microprocessor to perform some or all of the functionality of the plurality of modules.

System 10 may be accessed, for example, via one or more interfaces that may be implemented as a web page communicated from computing device 100 to a client (e.g., client device 30a), as an application such as a mobile application executing on a client (e.g., client device 30a) that generates the interface based on information communicated from computing device 100, an agent running on the computing device, and/or via other interfaces.

The plurality of modules may include, for example, registration module 110, provider registration module 120, role-based permissions module 130, activity management module 140, carpool management module 150, group management module 160, content sharing module 170, reporting module 180, transaction management module 190, storage module 105, and/or other modules 195.

Network 20 may comprise, for example, a Wide Area Network, Local Area Network, the Internet, a cloud-based network and/or other network or any combination thereof.

Implementations of the invention may be made in hardware, firmware, software, or any suitable combination thereof. Aspects of the invention may also be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described herein in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

System 10 may facilitate automated community schedule management including registration, management, and sharing of activity, group, and carpool information. System 10 may enable a caregiver to register participants in one or more activities. For example, a caregiver may register himself or herself and/or one or more contacts (for whom the caregiver may schedule activities) as participants of an activity. A contact of the caregiver may be, for example, a family member of the caregiver, a friend of the caregiver, a friend of a family member of the caregiver, a group of one or more family members and/or friends, an organization, an entity, and/or other contact.

System 10 may also enable one or more activity providers to register and administer one or more activities. Activity providers may include, for example, administrators of an activity, teachers, volunteers involved with an activity, and/or other persons with a role of responsibility related to an activity being provided.

As used herein, an activity may include an event in which one or more participants may participate. Types of activities may include, for example, sports, extracurricular classes, clubs, groups, organizations, affiliations, community organizations, educational activities, and/or other activity types. Activities registered with system 10 are not limited to the examples described herein.

According to an aspect of the invention, system 10 may enable a carpool creator to create and/or one or more carpools. A carpool may comprise one or more carpool instances. A carpool instance may relate to a single transportation of one or more passengers. A carpool may comprise one or more recurring carpool instances. A carpool may enable one or more passengers to be transported to and from an activity. In some implementations, a carpool may also enable one or more passengers to be transported to destinations and/or events separate from the activities. Drivers and passengers may be matched to a carpool and/or carpool instance.

Registration module 110 may be configured to enable a caregiver to register with system 10 and associate one or more contacts with the caregiver.

Provider registration module 120 may be configured to enable an activity provider to register with system 10 and associate one or more activities and/or activity schedules with the activity provider.

Role-based permission module 130 may be configured to tailor access to the system based on roles of various users including, for example, a role in system 10, role for an activity, role for a class, role in a carpool, and/or other roles.

Activity management module 140 may enable caregivers and/or activity providers to create, view and/or register activities.

Carpool management module 150 may be configured to enable a carpool creator to, for example, create one or more carpools, create one or more carpool instances for a carpool, view one or more carpools, enable drivers to register for one or more carpool, enable drivers to register for one or more carpool instances, match passengers to one or more carpools, match passengers to one or more carpool instances, and/or other functionality related to the creation or management of a carpool.

Group management module 160 may be configured to create and/or manage one or more groups. A group may be created to enable members of the group to share content. Groups may include one or more group members associated with, for example, an activity, a class, a carpool, a carpool instance, a location, and/or other types of associations. Content sharing module 170 may be configured to facilitate sharing of caregiver content, activity content, group content, carpool content, and/or other content, as described herein.

Storage module 105 may be configured to store information related to system usage, caregiver content, activity content, carpool content, group content, and/or other content.

Reporting module 180 may be configured to facilitate analysis and report information related to system usage, caregiver content, activity content, carpool content, group content, and/or other.

Transaction management module 190 may be configured to track transactions relating to activity providers, caregivers, and/or other users of system 10.

System 10 may include other module(s) 190 as well.

Registration Module

Figure 2:
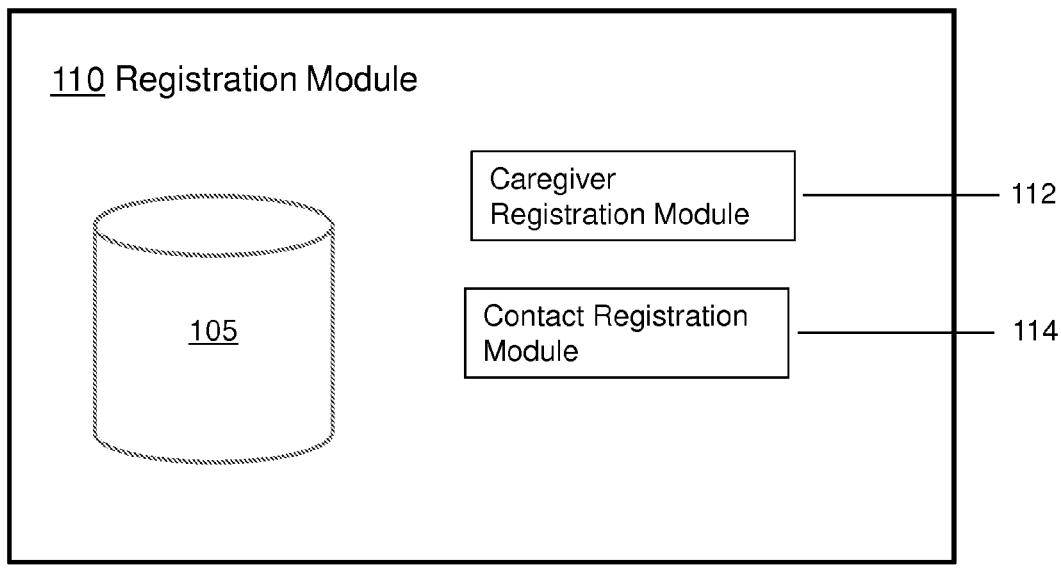
FIG. 2 illustrates a block diagram of an exemplary registration module, according to an aspect of the invention.

As shown in FIG. 2, registration module 110 may comprise one or more modules such as, for example, caregiver registration module 112, contact registration module 114, and/or other modules. Caregiver registration module 112 may enable a caregiver to register with system 10. Contact registration module 114 may enable a caregiver to register and one or more contacts of the caregiver.

In some implementations, caregiver registration module 112 may accept and store profile information for a caregiver. Profile information for a caregiver may include, for example, contact information for the caregiver, demographic information for the caregiver, calendar information for the caregiver, role-based information for the caregiver, activities associated with the caregiver, carpools associated with the caregiver, one or more contacts associated with the caregiver, activities and/or carpools associated with contacts associated with the caregiver, and/or other information.

In some implementations, caregiver registration module 112 may accept and store profile information for a caregiver. Profile information for a caregiver may include, for example, contact information for the caregiver, demographic information for the caregiver, calendar information for the caregiver, role-based information for the caregiver, activities associated with the caregiver, carpools associated with the caregiver, one or more contacts associated with the caregiver, activities and/or carpools associated with contacts associated with the caregiver, and/or other information.

Calendar information for a caregiver may include, for example, a schedule of the caregiver, one or more schedules for one or more contacts associated with the caregiver, one or more schedules of activities associated with the caregiver, one or more schedules of activities associated with one or more contacts associated with the caregiver, one or more schedules of carpools, one or more schedules of carpool instances associated with the caregiver, one or more schedules of carpool instances associated with contacts associated with the caregiver, and/or other calendar information.

In some implementations, a system calendar may be maintained for a caregiver. The system calendar may be synched with one or more commercially available calendars, contacts, or other software programs of the caregiver, including, for example, MICROSOFT OUTLOOK, GOOGLE Calendars, FACEBOOK Events, and/or other commercially available calendar software. In some implementations, one or more commercially available calendars of contacts of the caregiver may be associated with the system calendar of the caregiver as well. Additionally, one or more other calendars of the caregiver and/or contacts of the caregiver may be associated with the system calendar of the caregiver. In some implementations, when one or more of activity management module 140, carpool management module 150, group management module 160, and/or other modules update a calendar of the caregiver, one or more other calendars of the caregiver may also be updated.

In some implementations, contact registration module 114 may enable a caregiver to manage and associate one or more contacts with the caregiver. For example, contact registration module 114 may enable a caregiver to add, modify and/or delete one or more contacts from a caregiver profile. Contact registration module 114 may also enable a caregiver to manage one or more contact's access to caregiver content, a caregiver's profile, content associated with the contact, and/or other content.

In some implementations, contact registration module 114 may also enable a caregiver to create a profile for a contact. A contact profile may include, for example, personal information of the contact, access restrictions by caregiver, and/or other contact profile content.

In some implementations, contact registration module 114 may enable a caregiver to identify one or more contacts as a joint caregiver. A joint caregiver may have a same access and roles as a caregiver in system 10. For example, a joint caregiver may be a life partner, relative, spouse of the caregiver, and/or other contact chosen by the caregiver. A joint caregiver may also be, for example, a parent and/or guardian of a contact of the caregiver.

In some implementations, contact registration module 114 may enable a caregiver to identify one or more contacts as a joint caregiver for one or more identified contacts. For example, the joint caregiver may have the same access and roles as a caregiver with respect to the one or more identified contacts.

Provider Registration Module

Provider registration module 120 may enable an activity provider to register with system 10, and to associate one or more activities and activity schedules with the activity provider. In some implementations, provider registration module 120 may accept and store profile information for an activity provider. Profile information for an activity provider may include, for example, contact information for the activity provider, calendar information for the activity provider, contacts associated with the activity provider, role-based information for the activity provider, role-based information for contacts associated with the activity provider, one or more activities associated with the activity provider, and/or other profile information.

In some implementations, provider registration module 120 may accept and store registration information for an activity from an activity provider. Activity registration information may include, for example, description information about the activity, administrators associated with the activity, one or more types of classes associated with the activity, a description of the one or more types of classes associated with the activity, instructors associated with one or more classes, schedules associated with the activity, schedules associated with one or more classes of the activity, one or more time periods during which the activity occurs, dates and times during which one or more classes of the activity occurs in a time period, a maximum number of participants for the activity, a maximum number of participants for one or more classes of the activity, requirements for participants of the activity, a waitlist for one or more classes, and/or other activity registration information. Requirements for participants of the activity may include, for example, required and/or requested experience (e.g., having taken one or more prerequisite classes, having passed one or more tests, and/or other experiences), an age range, gender, location, skill level, any combination thereof, and/or other requirements.

In some implementations, provider registration module 120 may enable an activity provider to identify one or more contacts as a proxy activity provider. A proxy activity provider may have a same access and roles as an activity provider in system 10. For example, a proxy activity provider may be an administrator of an activity associated with the activity provider, an instructor of an activity associated with the activity provider, an instructor of a class associated with the activity provider, and/or other contact chosen by the activity provider.

Provider registration module 120 may also enable an activity provider to identify one or more contacts as a proxy activity provider with respect to one or more activities and/or classes associated with an activity. For example, the proxy activity provider may have a same access and roles as an activity provider with respect to identified contacts.

Provider registration module 120 may also facilitate creation of a profile for a proxy activity provider. A proxy activity provider profile may include, for example, personal information of the proxy activity provider, access restrictions by proxy activity provider, and/or other information.

Role-Based Permission Module

Role-based permission module 130 may be configured to tailor access to system 10 based on roles of various users including, for example, a role in system 10, a role for an activity, a role for a class, a role in a carpool, and/or other role. For a caregiver, as an example, access may include access to one or more modules, access to caregiver content stored at storage module 105, access to activity content associated with the caregiver, access to activity content associated with one or more contacts of the caregiver, and/or other access. Access for an activity provider may include, for example, access to one or more modules, access to activity content stored at storage module 105, access to caregiver content associated with activities associated with the activity provider, and/or other access.

Role-based permissions module 130 may maintain a plurality of roles, including, for example, caregiver, activity provider, contact, participant, administrator, proxy activity provider, joint caregiver, carpool driver, passenger, and/or other roles.

Activity Management Module

Figure 3:
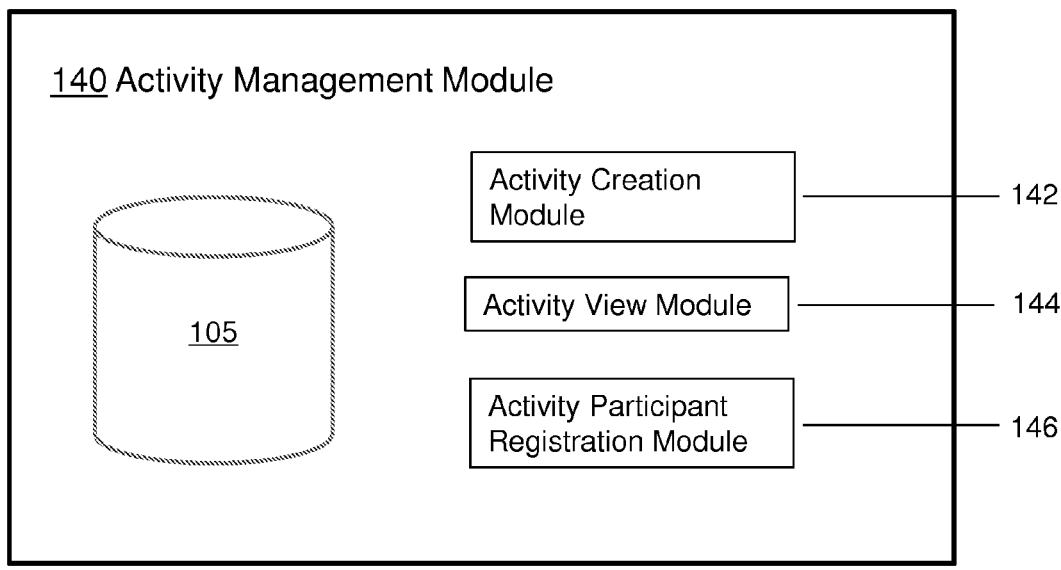
FIG. 3 illustrates a block diagram of an exemplary activity management module, according to an aspect of the invention.

Activity management module 140 may enable caregivers and/or activity providers to create, view and/or register activities. As shown in FIG. 3, activity management module 140 may comprise one or more modules including, for example, activity creation module 142, activity view module 144, activity participant registration module 146, and/or other modules.

Activity creation module 142 may enable an activity provider to create one or more activities, and to create one or more classes associated with an activity. In some implementations, activity creation module 142 may accept and store activity registration information for an activity from an activity provider.

Activity view module 144 may display one or more lists of activities. For example, the lists of activities displayed may include new activities, activities registered during one or more date ranges, activities by activity provider, activities by type, activities by location, activities by time and location of one or more classes, activities in which space is available for participants, and/or other lists of activities displayed. Activity view module 144 may also facilitate the display of activity information for an activity.

Activity view module 144 may also facilitate access to activities of a specific type. In some implementations, a caregiver, for example, may search for a specific activity or a type of activity using one or more criteria. The criteria may include, for example, new activities, activities registered during one or more date ranges, activities by activity provider, activities by type, activities by location, activities by time and location of one or more classes, activities in which space is available for participants, and/or other criteria.

Activity participant registration module 146 may enable a caregiver to register and manage one or more contacts of the caregiver as a participant of an activity and/or one or more classes of an activity. In some implementations, activity participant registration module 146 may enable a caregiver to add, modify and/or delete a participant from an activity and/or one or more classes associated with an activity.

Activity participant registration module 146 may also determine whether a participant meet requirements for an activity and/or for a class. For example, activity participant registration module 146 may determine whether a participant meet activity and/or class requirements based on registration information for the activity. Activity participant registration module 146 may also facilitate the inclusion of the class schedule on a calendar of the caregiver.

When an activity and/or a class of an activity for which registration is sought has no availability, activity participant registration module 146 may enable an activity provider to maintain one or more waitlists for the activity and/or the class. In some implementations, the activity provider may determine whether to maintain a waitlist for an activity and/or a class. For example, the activity provider may make decide whether to make available a waitlist option for a caregiver that is unable to register a participant for a class and/or an activity. In another example, when a number of participants who register for the activity and/or the class exceeds a maximum number of participants (as per, for example, the activity profile information), the activity participant registration module 146 may automatically create a waitlist.

Placement on the waitlist may rely on one or more waitlist criteria. Waitlist criteria may include, for example, one or more of: date of attempted registration, previous participation in the activity and/or class, participation by other contacts of the caregiver that is trying to register a participant, one or more preferences of the activity provider, and/or other waitlist criteria.

In some implementations, activity participant registration module 146 may also enable a caregiver to pay fees for an activity and/or a class for which a caregiver has registered a participant. Fees may include, for example, registration fees, insurance fees, equipment fees, and/or other fees. Payment may be facilitated via one or more methods. Payment methods may include, for example, payment via check, via cash, via electronic check, via PAYPAL, via credit card, via an online payment system, and/or other payment methods.

Carpool Management Module

Carpool management module 150 may be configured to enable a carpool creator to, for example, create one or more carpools, create one or more carpool instances for a carpool, viewing one or more carpools, facilitate the registration of drivers for one or more carpools, match passengers to one or more carpools, and/or engage in other carpool creation or management activity.

In some implementations, a carpool may comprise one or more carpool instances, where a carpool instance may comprise a single instance of transportation from an origination point to a destination for one or more drivers and one or more passengers. Carpool destinations may include, for example, one or more activities, one or more classes, one or more other events, and/or other destinations.

Figure 4:
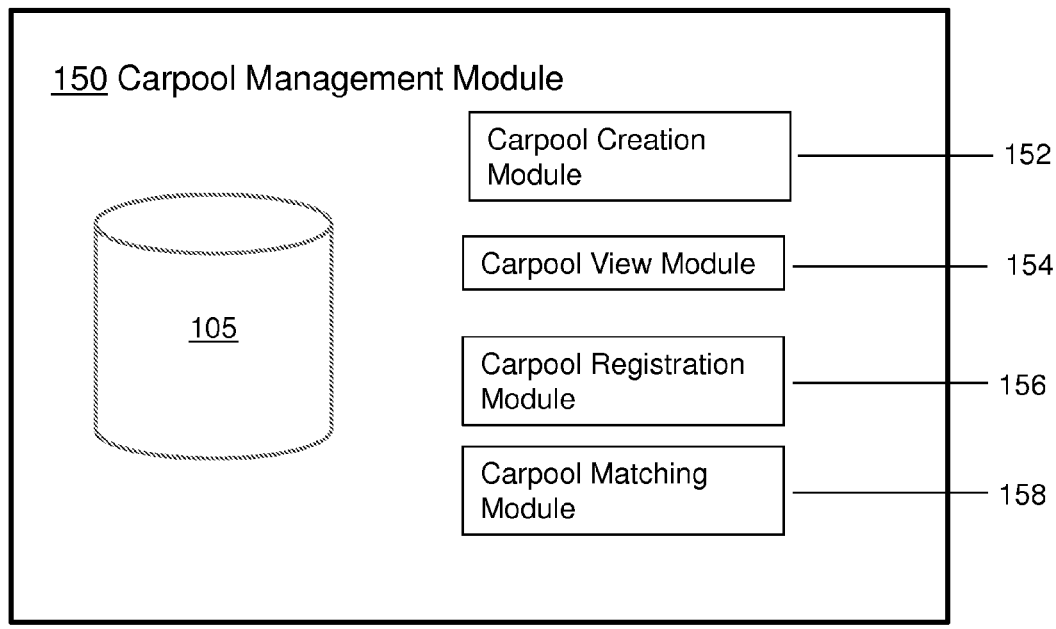
FIG. 4 illustrates a block diagram of an exemplary carpool management module, according to an aspect of the invention.

As shown in FIG. 4, carpool management module 150 may comprise one or more modules such as, for example, carpool creation module 152, carpool view module 154, carpool registration module 156, carpool matching module 158, and/or other modules.

Carpool creation module 152 may facilitate the creation of one or more carpools and/or one or more carpool instances. In some implementations, carpool creation module 152 may enable a carpool creator to create one or more carpools with each carpool comprising one or more carpool instances. A carpool creator may be a caregiver, an activity provider, a contact of a caregiver, a contact of an activity provider, and/or other individual.

In some implementations, carpool creation module 152 may accept and store carpool information for a carpool and/or a carpool instance from a carpool creator. Carpool information may include, for example, a carpool creator, a carpool identifier, a destination, origination point, description information about the carpool, one or more types of carpools, a description of the one or more types of carpool, a time period during which a carpool occurs, dates and times during which a carpool occurs, one or more drivers for a carpool, one or more passengers for a carpool, one or more preferred passengers for a carpool, a maximum number of passengers for a carpool, requirements for passengers in a carpool, requirements for drivers in a carpool, a waitlist for one or more carpools, and/or other carpool information.

A carpool identifier may comprise a unique name that identifies a carpool. The carpool identifier may be random or based on one or more pieces of carpool information, including, for example, destination, origination point, driver, time, date, type of car, date, preferred passengers, mid-route stops, availability, any combination thereof, and/or other identifiers related to a carpool.

Driver requirements may include, for example, age range of the driver, type of vehicle being driven by the driver, preferred passengers of the driver, number of passengers the driver is able to transport, equipment to be transported, storage capability of the driver's vehicle, minimum safety record for the driver, one or more types of insurance for the driver, liability waivers by the driver, liability waivers of one or more preferred passengers of the driver, and/or other driver requirements.

Carpool view module 156 may facilitate the display of one or more carpools and/or one or more carpool instances. Carpool view module 154 may also display one or more lists of carpools and/or carpool instances that meet one or more carpool criteria associated with the list. Carpool criteria may include, for example, one or more items of carpool information such as destination, time, and date, newly created carpools, carpools created during a specific date and/or time range, carpools in which space is available for passengers, carpools for which a driver is not available, carpools for which a driver is available, and/or other criteria.

Carpool view module 154 may also enable a search for one or more carpools and/or one or more carpool instances. For example, the carpool view module 154 may enable a caregiver to search for a specific carpool, search for a specific carpool instance, and/or search for carpools and/or carpool instances meeting one or more carpool criteria.

Carpool registration module 156 may facilitate the registration of one or more drivers for one or more carpools and/or one or more carpool instances. Carpool registration module 156 may accept and store driver profile information for one or more drivers. The driver profile information may be accepted and stored from a carpool creator, a driver, from a caregiver, and/or from an activity provider.

A driver may be, for example, a caregiver, a contact associated with a caregiver, an activity provider, a contact associated with an activity provider, and/or other person associated with a caregiver or activity provider. Driver profile information may include, for example, personal information about the driver, whether the driver is a caregiver, whether the driver is an activity provider, one or more preferred passengers of the driver, one or more preferred routes, one or more activities associated with the driver, one or more classes associated with the driver, one or more carpools associated with the driver, one or more carpool instances associated with the driver, one or more origination points, potential mid-route stops, one or more vehicles driver by the driver, storage capability of the one or more vehicles of the driver, insurance of the driver, and/or other driver profile information.

Carpool registration module 156 may also accept and store passenger profile information for one or more passengers for one or more carpools and/or carpool instances. For example, carpool registration module 156 may accept and store passenger profile information from a passenger, a caregiver associated with a passenger, an activity provider associated with an activity in which the passenger is a participant, and/or other person associated with the passenger.

A passenger may be a person to be transported using the carpool. A passenger may be, for example, a caregiver, a contact associated with a caregiver, an activity provider, a contact associated with the activity provider, and/or other person who desires transportation using the carpool. Passenger profile information may include, for example, personal information about the passenger, emergency contact information for the passenger, whether the passenger is able to drive, equipment that the passenger may carry, allergies and/or other safety information about the passenger, one or more preferred routes of the passenger, one or more activities associated with the passenger, one or more classes associated with the passenger, one or more other passengers associate with the passenger, one or more origination points, and/or other passenger profile information.

In some implementations, carpool registration module 156 may facilitate the addition, modification and/or deletion of one or more drivers for a carpool and/or carpool instance. Carpool registration module 156 may also facilitate the addition, modification and/or deletion of one or more passengers for a carpool and/or carpool instance.

Carpool registration module 156 may also determine whether a driver meet requirements for a carpool and/or carpool instance based on, for example, driver requirements associated with the carpool and/or the carpool instance. Carpool registration module 156 may also facilitate the inclusion of a schedule on a calendar of persons associated with the carpool. For example, carpool registration module 156 may enable a calendar of a caregiver of a passenger in a carpool instance to be updated with a schedule associated with the carpool instance. The calendar of a driver of a carpool and/or a carpool instance may also be updated. When the carpool is associated with an activity, a system calendar associated with the activity may also be updated.

Carpool matching module 158 may match drivers and/or passengers to a carpool. In some implementations, carpool matching module 158 may match drivers and/or passengers to a carpool and/or carpool instance. In some implementations, carpool matching module 158 may match drivers and/or passengers for a carpool and/or a carpool instance. For example, carpool matching module 158 may determine the allocation of one or more carpool instances of a carpool to one or more registered drivers and one or more passengers by one or more allocation methods and by using one or more criteria. The criteria may include, for example, whether one or more drivers volunteered for one or more respective carpool instances, load balancing, preference of drivers based on registration date of the driver, driver preference based on other criteria, destination, origination point, and/or mid-route stops of a driver, preferred passengers for a driver, number of passengers along a driving route for a driver, schedules of one or more drivers, manual allocation by a carpool creator, manual allocation by or more drivers, manual allocation by an activity provider, a combination thereof, and/or other criteria. In some implementations, carpool matching module 158 may select a driver to be matched to a carpool instance when carpool matching module 158 has determined that the selected driver has been matched to the least amount of carpool instances.

In some implementations, carpool matching module 158 may indicate when a carpool and/or carpool instance has not been allocated a driver. Carpool matching module 158 may then send a notification of the lack of a driver to registered drivers and caregivers associated with passengers for the carpool and/or carpool instance that have not been allocated a driver. The notification may also comprise a request for the receiver of the notification to register for the carpool and/or volunteer to be matched for the unallocated carpool and/or carpool instance. Carpool matching module 158 may also indicate when a carpool and/or carpool instance has been allocated a driver but does not include any passengers or has available space for one or more passengers.

Carpool matching module 158 may also notify a driver matched to a carpool and/or a carpool instance of the match. Carpool matching module 158 may further remind a driver matched to a carpool and/or a carpool instance of the driver's duty to drive. For example, carpool matching module 158 may send a notification to a driver a predetermined time before the carpool instance to which the driver is matched is to begin. The notification may comprise, for example, a text message, an email, a phone call, and/or other type of alert to notify the driver. The driver may receive the notification one day before the carpool instance is to begin, six hours before, one hour before, and/or any other predetermined amount of time before the carpool instance is to begin.

Group Management Module

Group management module 160 may be configured to enable one or more group administrators to create and/or manage one or more groups. The one or more group administrators may include, for example, one or more caregivers, contacts, activity providers, participants, drivers, passengers, and/or other persons who may create and manage a group.

In some implementations, one or more types of groups may be created. Group types may include, for example, groups including persons invited by one or more group administrators, groups associated with an activity, groups associated with one or more classes, groups associated with one or more carpools, groups associated with one or more carpool instances, groups associated with a certain location, and/or other types of groups.

In some implementations, group management module 160 may enable one or more group administrators to invite, modify, and/or delete group members of a group. Group members may include the one or more group administrators and persons invited by one or more group administrators. For example, group management module 160 may enable a group administrator to send an invitation to a potential group member to join a group. The potential group member may decline the invitation or may accept the invitation and be included as a group member of the group.

Group management module 160 may also facilitate the management of one or more group member's access to group content, a group profile, and/or other content associated with a group. In some implementations, group members may be able to invite another group member to join the group.

Figure 5:
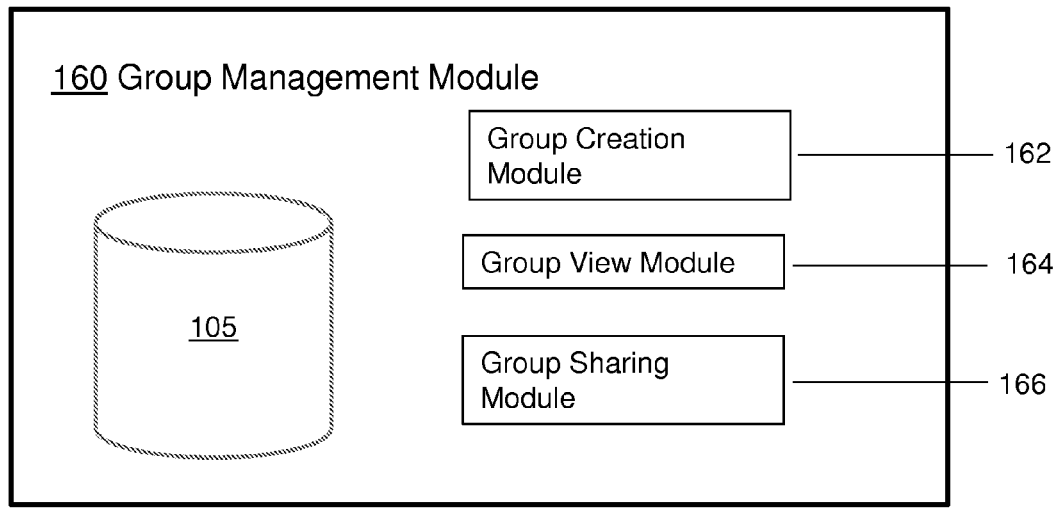
FIG. 5 illustrates a block diagram of an exemplary group management module, according to an aspect of the invention.

As shown in FIG. 5, group management module 160 may comprise one or more modules such as, for example, group creation module 162, group view module 164, group sharing module 166, and/or other modules.

In some implementations, group creation module 162 may enable a group administrator to create one or more groups. For example, group creation module 162 may accept and store group profile information from one or more group administrators. Group profile information may include, for example, one or more group administrators, one or more group members, a description of the group, requirements for group members, access restrictions to group content, and/or other group profile information.

Group view module 164 may facilitate the display of one or more groups and/or group content. Group view module 164 may further facilitate the display of group information. In some implementations, group view module 164 may display one or more lists of groups. For example, groups displayed in a list may include groups that meet one or more group criteria associated with the list. Group criteria may include, for example, new groups, groups created during one or more date ranges, groups by group administrator, groups by activity, groups by class, groups by carpool, groups by carpool instance, groups by type, groups by location, groups by time and location of one or more classes, groups in which new members are invited, and/or other types of group displayed.

Group view module 164 may also enable a search for one or more groups. For example, group view module 164 may enable a caregiver or other users to search for a specific group, search for a specific type of group, and/or search for groups based on one or more group criteria.

In some implementations, group view module 164 may also facilitate the display of some or all group content of a group when displaying group information for a group.

Group view module 164 may also enable a search for one or more groups. For example, group view module 164 may enable a caregiver to search for a specific group, search for a specific type of group, and/or search for groups based on one or more of the group criteria.

In some implementations, group view module 164 may also facilitate the display of some or all group content of a group when display a group.

Group sharing module 166 may enable group members to share group content and/or group profile information. Group sharing module 166 may enable group members to share group content and/or group profile information. In some implementations, one or more group administrators may set restrictions as to who may provide content to the group. Group content may include, for example, an identification of a content provider such as a group member, and information provided by the content provider.

Some or all group members may provide content to the group. In some implementations, only group administrators may provide content to the group. Group administrators may also select one or more group members who are authorized to provide content to the group. In some implementations, any group member may provide content to the group.

When content is provided to a group, that content may be made available (e.g., by display) for some or all group members. In some implementations, group content may only be made available to group administrators. Group administrators may then provide the content to some or all group members. In some implementations, group content may be provided to only one or more group administrators and/or group member of the content provider's choosing.

Group sharing module 166 may further enable one or more group members to share group content. In some implementations, one or more group administrators may set restrictions as to who may share group content and/or with whom group content may be shared. For example, only group administrators may share group content with persons outside of the group. In another example, group administrators may select one or more group members who are authorized to share group content with persons outside of the group. In some implementations, any group member may share group content.

When a group member provides an item of group content, the group member may also provide one or more content identifiers that may be associated and/or included with the item of group content. A content identifier may include, for example, a contact, activity provider, caregiver, group, carpool, carpool instance, activity, class, location, date, time, and/or other identifiers related to an item of content.

In some implementations, group sharing module 166 may enable a group member to tag or link an entity (e.g., people, places, locations, and/or other entities) to an item of group content. For example, one or more social media platforms with which a group member may be associated may search for the entity and may present potential entities that match the tagged or linked entity to the group member. Group sharing module 166 may facilitate the sharing of the item of group content with the tagged or linked entity. For example, group sharing module 166 may enable a group member to tag a FACEBOOK friend to an item of content. Group sharing module 166 may facilitate the sharing of the item of content on FACEBOOK with the FACEBOOK friend tagged to the item of content. For example, group sharing module 166 may facilitate a posting of the item of content on a wall of the Facebook friend tagged to the item of content.

Group content may be shared via one or more sharing methods. The media by which group content is shared may include, for example, video, text, picture, link, tag, TWEET, social media post, blog post, re-sharing via social media, a combination thereof, and/or any other media.

Group sharing module 166 may also be configured to enable a group member or person with whom the group content is shared to share additional information in response to receiving group content. The medium by which the additional information is shared may include, for example, video, text, picture, link, tag, TWEET, re-sharing of the related information via social media, a combination thereof, and/or any other media.

Content Sharing Module

Content sharing module 170 may be configured to share content such as, for example, caregiver content, activity content, carpool content, group content, and/or other content. In some implementations, some or all of an item of content may be shared. An item of content may include, for example, an identification of a content provider that provided the item of content, and any information provided by the content provider. The content provider may also provide one or more content identifiers that may be associated with an item of content.

Content sharing module 170 may also restrict access and/or sharing of content. For example, content sharing module 170 may enable a content provider to select which portions of an item of content are shared. The content provider may also identify persons such as contacts, caregivers, and/or activity providers with whom the selected portions of the item are shared. In another example, content sharing module 170 may facilitate the sharing of a caregiver's calendar with one or more contacts.

Content sharing module 170 may also facilitate the sharing of content over one or more social media platforms. For example, one or more items of content may be linked or shared via social media platforms based on one or more content identifiers in the items. In another example, content sharing module 170 may facilitate the tagging or linking of entities (e.g. people, places, locations, and/or other entities) to an item of content. The tagged or linked entity may be registered with system 10 or may be separate from system 10. The item of content may be shared with the tagged or linked entity.

In some implementations, content sharing module 170 may facilitate sharing an item of content with a contact separate from system 10. For example, when the tagged or linked entity is separate from system 10, one or more social media platforms associated with the content provider of the item of content may search for the entity and may present potential entities that match the tagged or linked entity to the caregiver. Content sharing module 170 may facilitate the sharing of the item of content with the tagged or linked entity. For example, content sharing module 170 may enable a group member to tag a Facebook friend to an item of content. Content sharing module 170 may facilitate the sharing of the item of content on FACEBOOK with the FACEBOOK friend tagged to the item of content. For example, content sharing module 170 may facilitate a posting of the item of content on a wall of the FACEBOOK friend tagged to the item of content Storage Module Storage module 105 may be configured to store information related to system usage, caregiver content, activity content, carpool content, group content, and/or other content. Storage module 105 may further store any content developed and/or shared via system 10.

Reporting Module

Reporting module 180 may be configured to facilitate analysis of (and report information related to) system usage, caregiver content, activity content, carpool content, group content, and/or other content. Reporting module 180 may also be configured to produce statistics regarding content and/or sharing of content. Reporting module 180 may also be configured to prepare and/or display reports including one or more parts of the shared content and any statistics regarding that shared content.

Reporting module 180 may also be configured to maintain information related to an activity provider and/or related to an activity provider's role. For example, reporting module 180 may prepare a report describing participation over a certain period of time in an activity and/or one or more classes of an activity provider.

Additionally, reporting module 180 may be configured to maintain information related to a carpool and/or a carpool instance. For example, reporting module 180 may prepare a report describing driver statistics related to a car pool. Driver statistics may relate, for example, to timeliness of a driver, reliability of a driver, availability of a driver, safety of a driver, and/or other driver statistics.

Transaction Management Module

Transaction management module 190 may be configured to track transactions relating to caregivers, activity providers, and/or other users of system 10.

With respect to caregivers, transaction management module 190 may track the registration of a caregiver with system 10, the association of contacts with the caregiver, the registration, by a caregiver, of a participant for an activity, and/or other functionality in which a caregiver may engage. Transaction management module 190 may enable the caregiver to register an unlimited number of participants with an unlimited number of activities for the year when the caregiver pays an annual fee for registration. Alternatively, transaction management module 190 may enable a caregiver to pay an annual fee to access system 10 and a registration fee each time the caregiver registers a participant in an activity. Other business models to generate revenue from a caregiver may be implemented as well.

With respect to activity providers, transaction management module 190 may track the registration of an activity provider with system 10, the creation of an activity by an activity provider, the registration of participants in an activity associated with the activity provider, and/or other functionality in which an activity provider may engage. Transaction management module 190 may require an activity provider to pay an annual fee to access system 10, a participant registration fee each time a participant registers for an activity associated with the activity provider, an activity registration fee for each activity that the activity provider creates, any combination thereof, and/or other fees. Other business models to generate revenue from an activity provider may be implemented as well.

Transaction management module 190 may further be configured to manage a provision of advertisements at system 10. Transaction management module 190 may provide one or more types of advertising to users of system 10, including, for example, a featured advertisement centrally located on a home page of a website via which system 10 may be accessed, a banner advertisement that may displayed on the home page or another page of the website, and/or other types of advertisements. A user such as an activity provider and/or group member may pay an advertising fee to purchase a featured advertisement, banner advertisement, and/or other type of advertisement. The advertising fee may vary based on, for example, the type of advertisement purchased, an amount of time that the advertisement will be available on the system, a size of the advertisement, a number of advertisements purchased by the user, and/or other information associated with the advertisement purchase. Other methods of generating revenue may also be implemented.

Transaction management module 190 may further include the appropriate functionality for receiving and processing payments from users including, for example, credit card payments, payments via third parties such as PAYPAL, electronic check processing, and/or other types of payments.

Figure 6A:
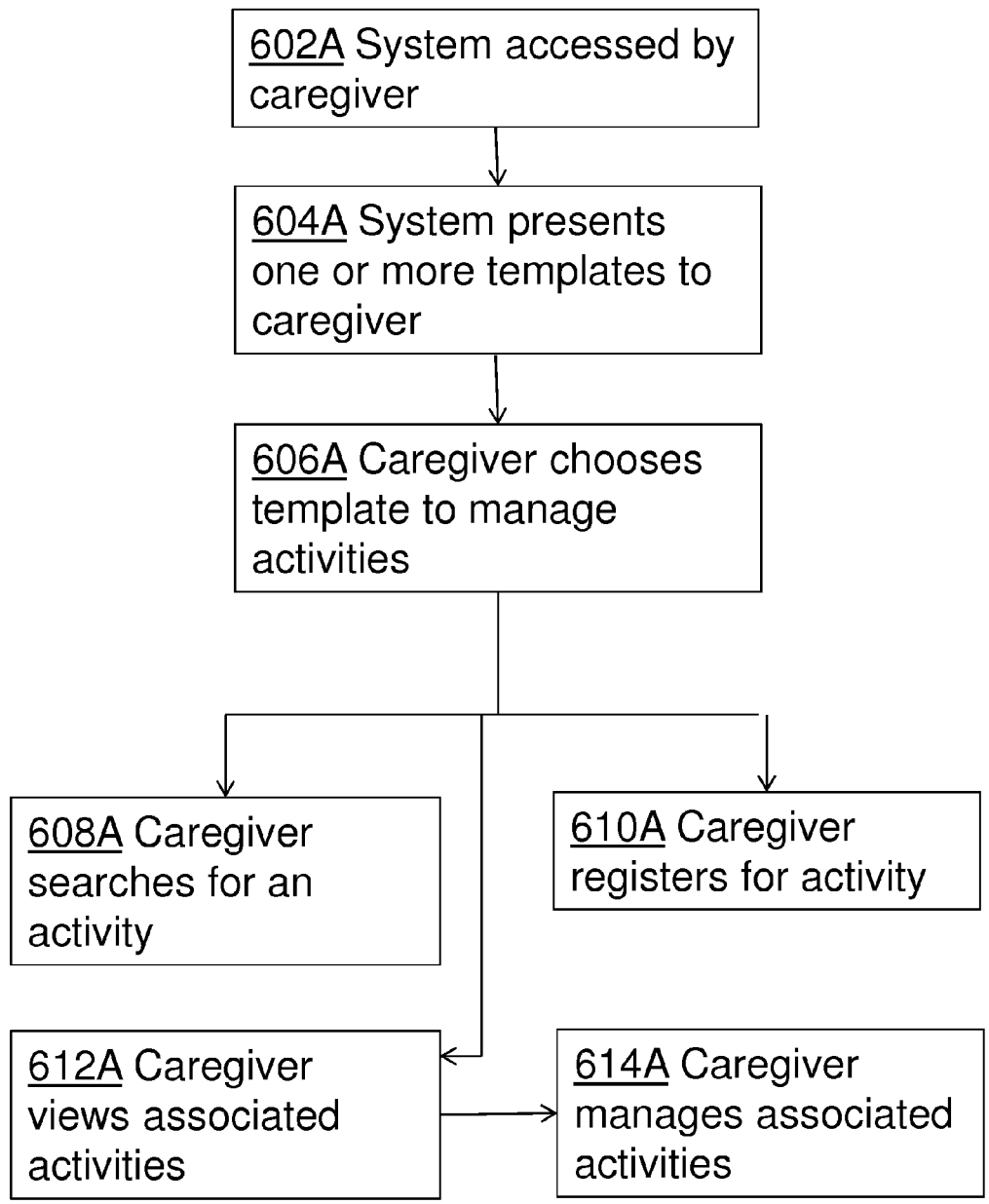
FIG. 6A illustrates an exemplary flowchart of processing, according to an aspect of the invention.
Figure 6B:
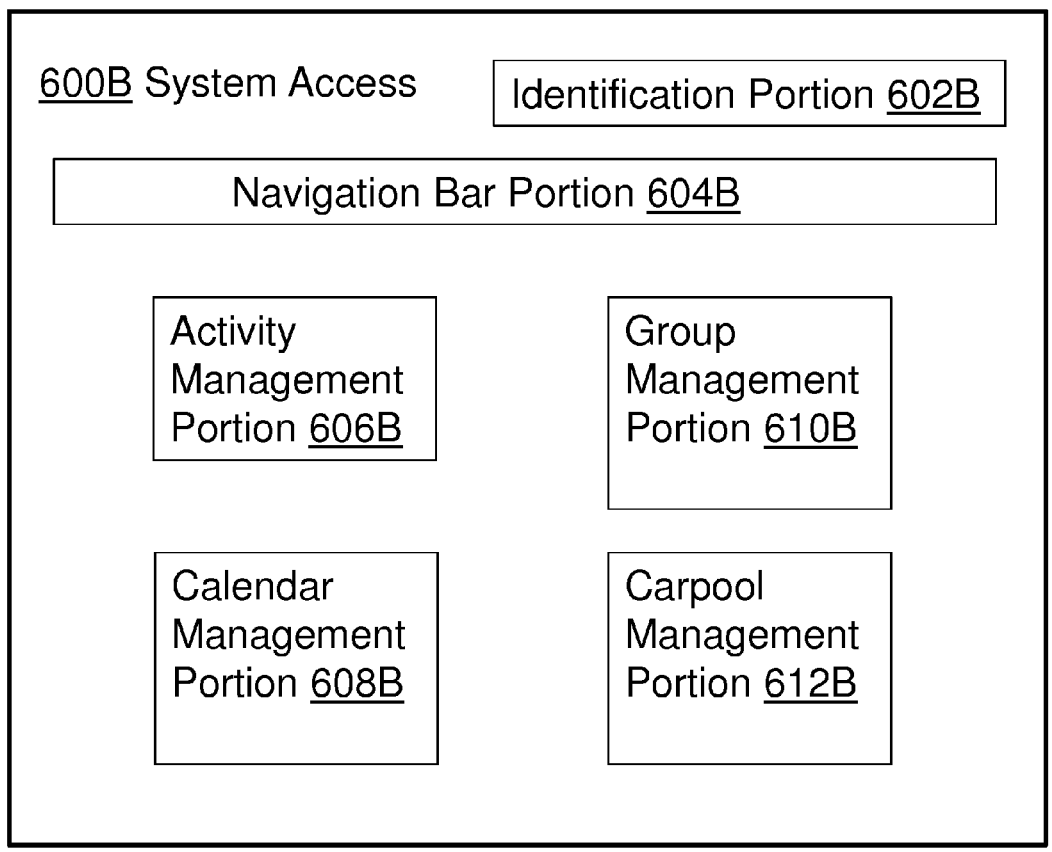
FIGS. 6B and 6C each depict exemplary screenshots, according to an aspect of the invention.
Figure 6C:
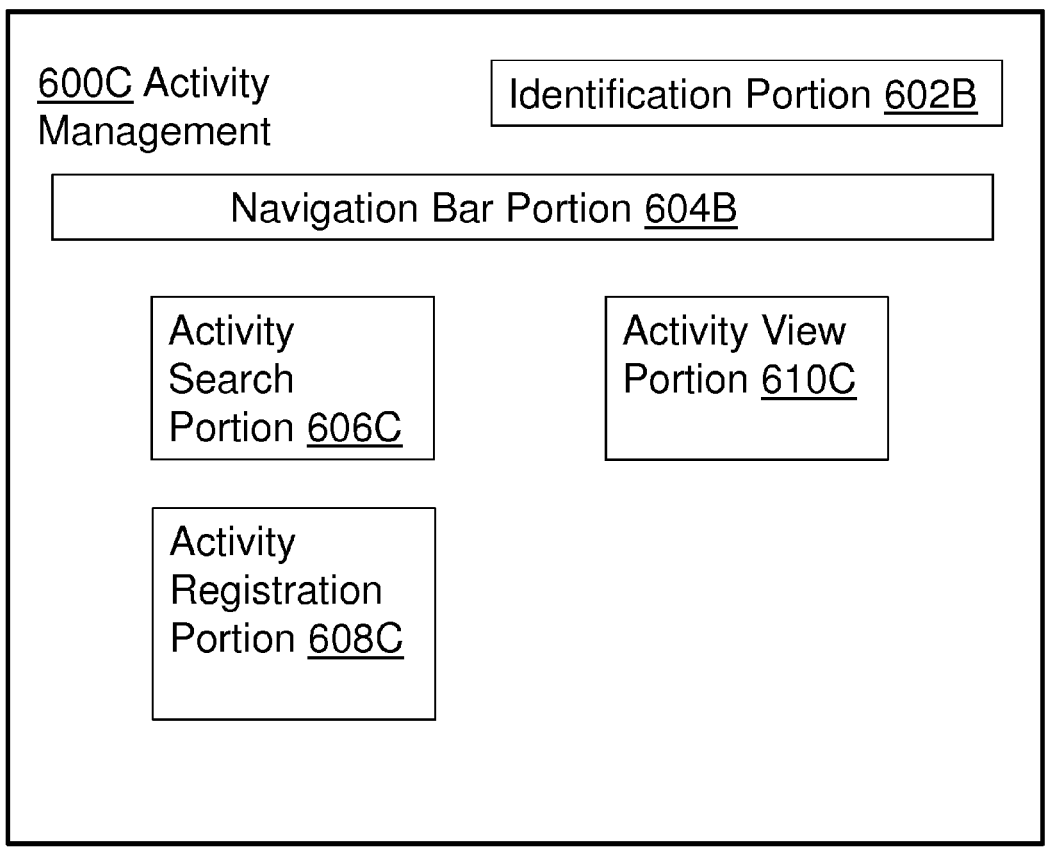

FIG. 6A illustrates an exemplary flowchart for processing, according to an aspect of the invention. FIG. 6B depicts an exemplary screenshot of an interface 600B that includes a template for system access, according to an aspect of the invention. FIG. 6C depicts an exemplary screenshot of an interface 600B that includes a template for activity management, according to an aspect of the invention. Processing will be described with respect to FIG. 6A in reference to the screen shots depicted in FIGS. 6B and 6C.

The described operations of FIG. 6A and other figures may be accomplished using some or all of the system components described in detail above and, in some implementations, various operations may be performed in different sequences. In other implementations, additional operations may be performed along with some or all of the operations shown in FIG. 6A and the other figures. In yet other implementations, one or more operations may be performed simultaneously. In yet other implementations, one or more combinations of various operations may be performed. Some implementations may not perform all of the operations described with relation to FIG. 6 and other figures. Accordingly, the operations described are exemplary in nature and, as such, should not be viewed as limiting.

The screenshots illustrated in FIG. 6B and other drawing figures are exemplary in nature. Various components may be added, deleted, moved, or otherwise changed so that the configuration, appearance, and/or content of the screenshots may be different than that illustrated in the figures. Accordingly, the graphical user interface objects as illustrated (and described in greater detail below) are exemplary by nature and, as such, should not be viewed as limiting.

Interface 600B and other interfaces described herein may be implemented as a web page communicated from computing device 100 to a client device, an application such as a mobile application executing on the client device that generates the interface based on information communicated from computing device 100, and/or other interface. Whichever type of interface is used, computing device 100 may communicate the data and/or formatting instructions related to the interface to the client device, causing the client device to generate the various interfaces of FIG. 6B and other interfaces. Furthermore, computing device 100 may receive data from the client device via the various interfaces.

In an operation 602A, a caregiver may access system 10. In some implementations, the caregiver may be registered with system 10 and profile information and contacts associated with the caregiver may already be stored at system 10 (for example, in storage module 105). In other implementations, when a caregiver is not registered with system 10, system 10 may prompt the caregiver to register with system 10, and provide profile information and/or associated contacts to be stored. Caregiver registration module 112 may enable the caregiver to register with system 10 and to associate contacts with his or her profile.

In an operation 604A, system 10 may present a selection or display of one or more templates to a caregiver via a user interface. In some implementations, the user interface (and one or more of the templates) may be accessed via various channels such as, for example, a webpage, a web portal, an agent (such as a software and/or hardware module) executing on a computing device that communicates with system 10, electronic mail and/or other communication channels that can be used to present the templates to a caregiver, an activity provider, a contact of a caregiver, a contact of an activity provider, and/or other person who may access system 10. In some implementations, system 10 may present a link to one or more templates.

In some implementations, the templates may include, for example, a template for system access, a template to manage activities, a template to manage a system calendar of the caregiver, a template to manage groups associated with the caregiver, a template to manage carpools, and/or other templates to present functionality to a caregiver.

One or more templates may correspond to one or more modules of computing device 100. For example, an activity management template may present (to a caregiver) functionality associated with registration module 110, activity management module 140, content sharing module 170, and/or other modules of computing device 100.

In an operation 606A, the caregiver may select a template to manage activities.

In an operation 608A, the caregiver may search for an activity. For example, a caregiver may search for an activity via one or more methods as described above with respect to activity view module 144. In an operation 610A, the caregiver may register a contact as a participant for an activity via one or more methods as described above with respect to the activity participant registration module 146. The caregiver may register the contact as a participant for an activity after searching for available activities via operation 608A. The caregiver may also register the contact as a participant for an activity after selecting the template to manage activities. In an operation 612A, the caregiver may view activities associated with the caregiver and/or with contacts associated with the caregiver. In an operation 614A, the caregiver may manage associated activities. For example, the caregiver may select an activity to manage from the activities displayed via operation 612A. The caregiver may manage an activity via one or more methods as described above with respect to the activity management module 140. In some implementations, one or more of the activity management module 140, and/or the storage module 190 may facilitate one or more of operations 608A, 610A, 612A, and/or 614A.

FIG. 6B illustrates an exemplary screenshot of an interface 600B that includes a template for system access, according to an aspect of the invention. In some implementations, user interface 600B may be presented that includes an exemplary template for system access. The template for system access may be presented to a caregiver upon initial access of system 10. The user interface 600B may include, for example, identification portion 602B, navigation bar portion 604B, activity management portion 606B, calendar management portion 608B, group management portion 610B, carpool management portion 612B and/or other portions that display information.

In some implementations, identification portion 602B may display, for example, a caregiver's name and a link via which the caregiver may log out of system 10. In some implementations, identification portion 602B may also include a link to the caregiver's profile information, via which the caregiver may view or edit profile information. In some implementations, navigation bar 604B may display one or more links to the one or more templates available via system 10. For example, navigation bar 604B may display links related to the template for system access, the template to manage activities, the template to manage a system calendar of the caregiver, the template to manage groups associated with the caregiver, the template to manage carpools, and/or other templates to present functionality to a caregiver.

In some implementations, activity management portion 606B may display activities with which a caregiver is associated. An activity may be displayed with a schedule, any associated groups, activity content, carpools and/or other content. The activity may be displayed with a link to a template to manage the activity. Activity management portion 606B may also be a link to a template for managing activities.

In some implementations, calendar management portion 608B may display a calendar displaying one or more schedules of the caregiver (or of contacts associated with the caregiver). The schedules may each comprise one or more calendar items. The calendar items may be displayed with any associated groups, content, carpools and/or other content. The calendar item may be displayed with a link to a template to manage the calendar, a template to share the calendar item, a template to share the calendar item and any associated calendar items, and/or to other templates. Calendar management portion 608B may also be a link to a template for managing the caregiver's calendar.

In some implementations, group management portion 610B may display one or more groups associated with the caregiver (or contacts associated with the caregiver). The group may be displayed with one or more group members, group content, any associated activities, any associated carpools, and/or other content. The group may be displayed with a link to a template to manage the group. Group management portion 610B may also comprise a link to a template for managing groups.

In some implementations, carpool management portion 612B may display one or more groups associated with the caregiver (or contacts associated with the caregiver). The group may be displayed with one or more items of carpool information, one or more drivers, one or more passengers, one or more carpool instances, any associated activities, any associated groups, and/or other content. The carpool may be displayed with a link to a template to manage the carpool. Carpool management portion 612B may also be a link to a template for managing carpools.

FIG. 6C illustrates an exemplary screenshot of a user interface 600C that includes a template by which an interviewee may manage interviewee content. The screenshot illustrated in FIG. 6C is similar to the screenshot illustrated in FIG. 6B with at least the following differences. In some implementations, user interface 600C may be presented that includes an exemplary template for activity management. The user interface 600C may include, for example, activity search portion 606C, activity registration portion 608C, activity view portion 610C, and/or other portions that display information.

In some implementations, activity search portion 606C may display one or more filters by which the caregiver may filter activities for display. Via the selection of one or more filters, the interface 600C may display activities that correspond to the one or more filters. The filters may include, for example, a date, a date range, time, month, age, location, type of activity, neighborhood, activity provider, and/or other criteria by which activities may be filtered. For example, if a selected filter relates to activity providers, activity search portion 606B may only display activities associated with the selected activity provider.

In some implementations, activity registration portion 608C may display one or more activities for which the caregiver may register a participant. The activities displayed may be based on a selection relating to the activity search portion 606C, may be a default set of activities, or may be another grouping of activities. The activities may be displayed in one or more orders. For example, one or more of the most recent and/or most available activities may be displayed. Other lists or orders of activities may also be displayed. An activity may be displayed in a manner similar to an activity as discussed above with respect to activity view module 144 and activity participant registration module 146. Activity registration portion 608C may also include a link to the template to register a participant for an activity.

In some implementations, activity view portion 610C may display one or more activities associated with the caregiver and/or with one or more contacts associated with the caregiver. For example, an activity may be displayed with a schedule, any associated groups, activity content, carpools and/or other content. The activity may be displayed with a link to a template to manage the activity.

Figure 7A:
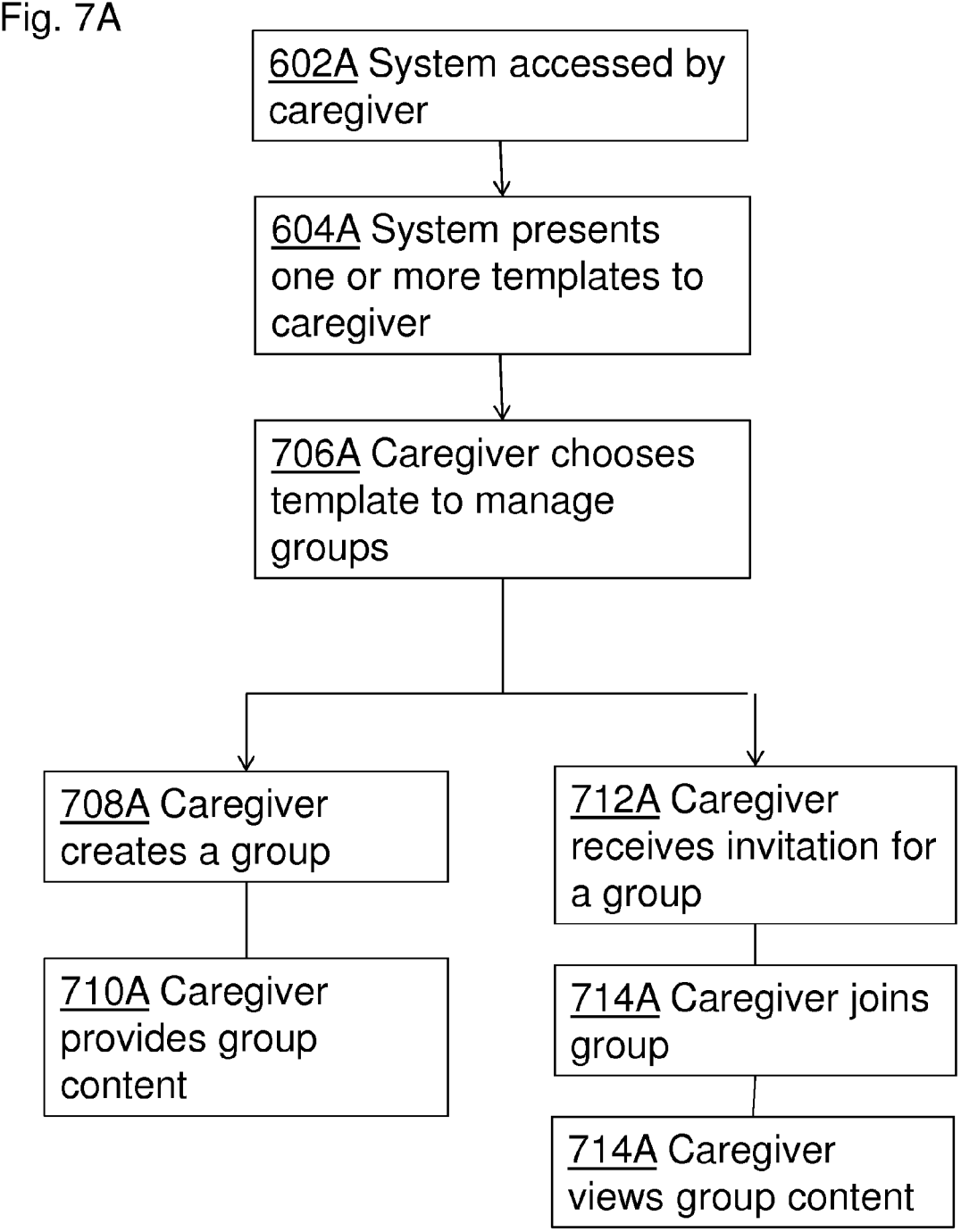
FIG. 7A illustrates an exemplary flowchart of processing, according to an aspect of the invention.
Figure 7B:
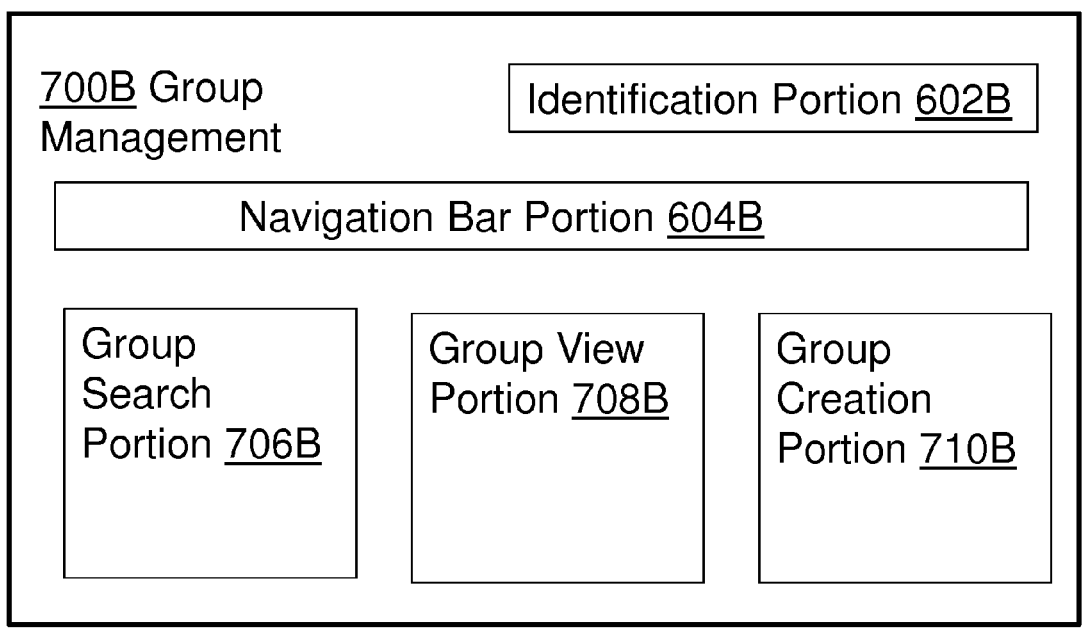
FIG. 7B depicts an exemplary screenshot, according to an aspect of the invention.

FIG. 7A illustrates an exemplary flowchart for processing, according to an aspect of the invention. FIG. 7B depicts an exemplary screenshot of an interface 700B that includes a template for group management, according to an aspect of the invention. Processing will be described with respect to FIG. 7A in reference to the screen shot illustrated in FIG. 7B. In some implementations, the process illustrated in FIG. 7A is similar to the process illustrated in FIG. 6A with at least the following differences in operation.

In an operation 706A, the caregiver may select a template to manage groups.

In an operation 708A, the caregiver may create a group. For example, a caregiver may create a group related to an activity associated with the caregiver. The caregiver may invite one or more associated contacts, other caregivers, activity providers, and/or other potential group members to join the group created by the caregiver. The caregiver may create a group via one or more methods as described above with respect to group creation module 162. In an operation 710A, the caregiver (or another group member) may provide content to the group. For example, the care giver (or group member) may provide content to the group via one or more methods as described above with respect to the group sharing module 166 or content sharing module 170A.

In an operation 712A, the caregiver may receive an invitation to join a group. In an operation 714A, the caregiver may join the group to which the caregiver was invited. In an operation 716A, the caregiver may view group content of the group that the caregiver joined. In some implementations, one or more of the group management module 160, the content sharing module 170, and/or the storage module 190 may facilitate one or more of operations 708A, 710A, 712A, 714A, and/or 716A.

FIG. 7B illustrates an exemplary screenshot of an interface 700A that includes a template for group management, according to an aspect of the invention. In some implementations, user interface 700B may be presented that includes an exemplary template for system access. The template for group management may be presented to a caregiver upon selection of a link to access the template for group management. The user interface 700B may include, for example, identification portion 602B, navigation bar portion 604B, group search portion 706B, group view portion 708B, group creation portion 710B, and/or other portions that display information.

In some implementations, group search portion 706B may display one or more filters by which the caregiver may filter groups for display. Via the selection of one or more filters, the interface 700B may display activities that correspond to the one or more filters. The filters may include, for example, a date, a date range, time, month, age, location, type of activity, group member, group creator, neighborhood, activity provider, and/or other criteria by which groups may be filtered. For example, if a selected filter relates to group creator, group search portion 706B may only display groups associated with the selected group creator.

In some implementations, group view portion 708B may display one or more groups associated with the caregiver and/or with one or more contacts associated with the caregiver. For example, a group may be displayed with one or more group members, any associated activities, any associated carpools, any group content, and/or other content. The group may be displayed with a link to a template to manage the group.

In some implementations, group creation portion 710B may display one or more input interfaces by which the caregiver may create a group. A group may be created in a manner similar to that as described above with respect to group creation module 162. For example, the caregiver may provide one or more items of group information via the group creation portion 710B, may invite one or more group members to the group, and may perform other functionality related to the creation of a group.

Figure 8A:
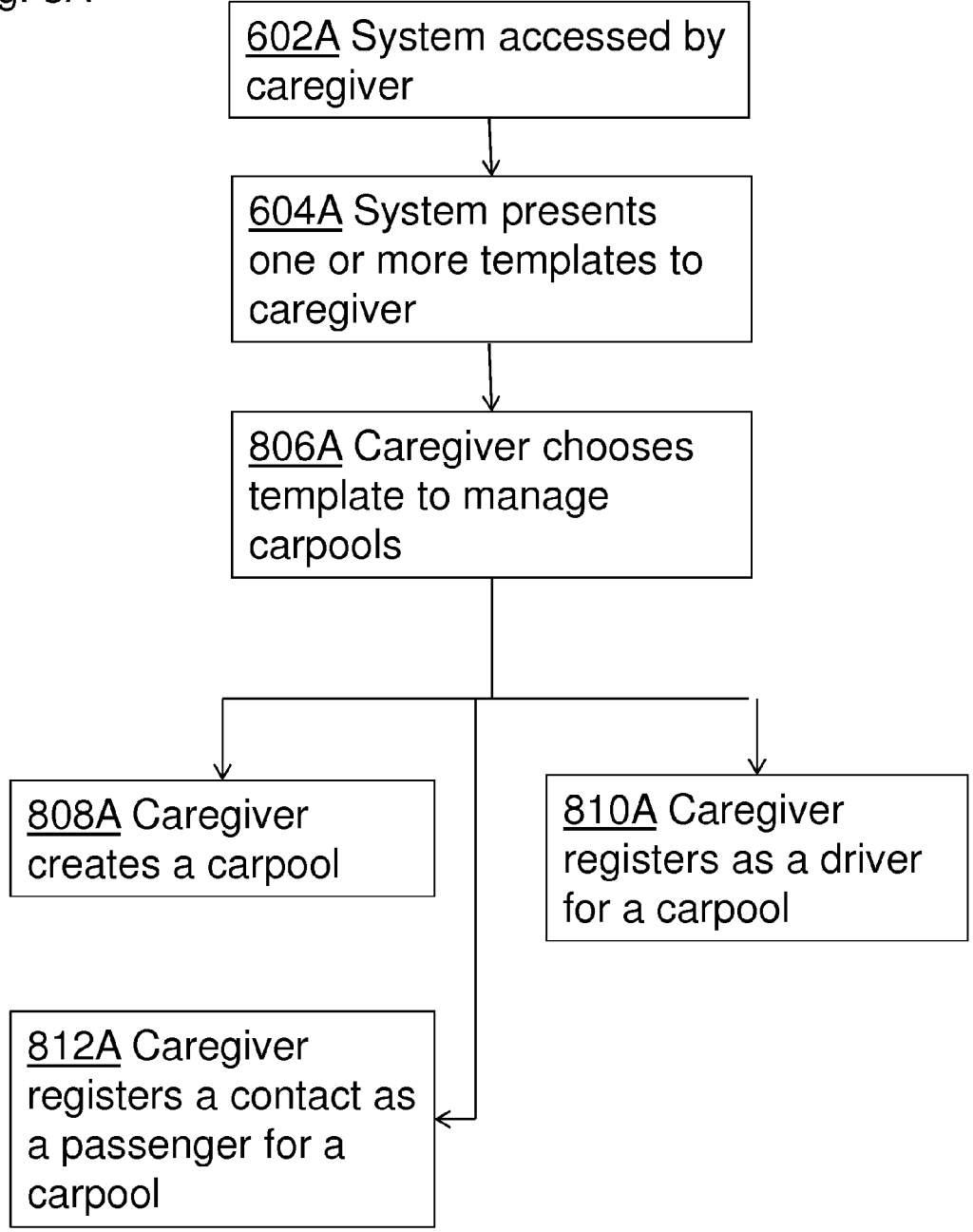
FIG. 8A illustrates an exemplary flowchart of processing, according to an aspect of the invention.

FIG. 8A illustrates an exemplary flowchart for processing, according to an aspect of the invention. FIG. 78B depicts an exemplary screenshot of an interface 800A that includes a template for carpool management, according to an aspect of the invention. Processing will be described with respect to FIG. 8A in reference to the screen shot illustrated in FIG. 8B. In some implementations, the process illustrated in FIG. 8A is similar to the process illustrated in FIG. 6A with at least the following differences in operation.

In an operation 806A, the caregiver may select a template to manage carpools.

In an operation 808A, the caregiver may create a carpool. For example, a caregiver may create a carpool related to an activity associated with the caregiver. The caregiver may register one or more participants of the activity as passengers for the carpool. The caregiver may also register as a driver for the carpool. The caregiver may create a carpool via one or more methods as described above with respect to carpool creation module 152. In an operation 810A, the caregiver may register as a driver for a carpool and/or a carpool instance. The caregiver may register as a driver for a carpool via one or more methods as described above with respect to carpool registration module 156.

In an operation 812A, the caregiver may join a carpool. For example, the caregiver may register a contact as a passenger in a carpool and/or in a carpool instance. The caregiver may join a carpool via one or more methods as described above with respect to carpool registration module 156 and/or carpool matching module 158. In an operation 814A, the caregiver may join the group to which the caregiver was invited. In some implementations, one or more of the carpool management module 150, and/or the storage module 190 may facilitate one or more of operations 806A, 808A, 810A, 812A and/or 814A.

Figure 8B:
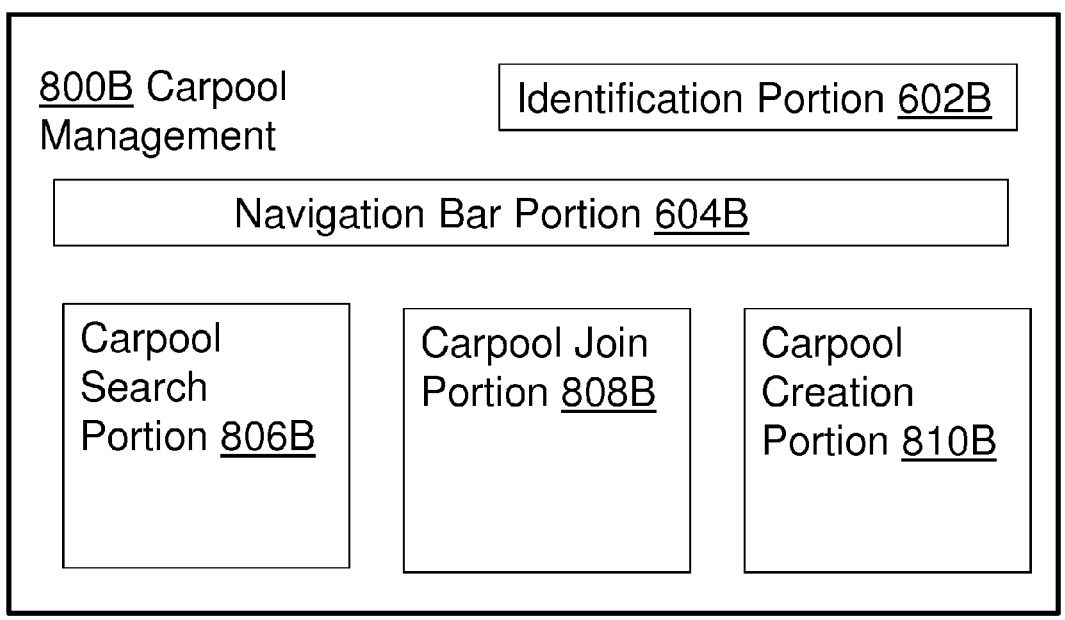
FIG. 8B depicts an exemplary screenshot, according to an aspect of the invention.

FIG. 8B illustrates an exemplary screenshot of an interface 800B that includes a template for carpool management, according to an aspect of the invention. In some implementations, user interface 800B may be presented that includes an exemplary template for carpool management. The template for carpool management may be presented to a caregiver upon selection of a link to access the template for carpool management. The user interface 800B may include, for example, identification portion 602B, navigation bar portion 604B, carpool search portion 806B, carpool join portion 808B, carpool creation portion 810B, and/or other portions that display information.

In some implementations, carpool search portion 806B may display one or more filters by which the caregiver may filter carpools for display. Via the selection of one or more filters, the interface 800B may display carpools that correspond to the one or more filters. The filters may include, for example, a date, a date range, time, month, age, location, driver, passenger, destination, mid-route stops, carpool creator, associated activity, equipment storage capabilities, and/or other criteria by which carpools may be filtered. For example, if a selected filter relates to carpool creator, carpool search portion 806B may only display carpools associated with the selected carpool creator. A carpool may also be displayed with a link to a template to join a carpool. For example, the caregiver may join a carpool as a passenger and/or as a driver.

In some implementations, carpool join portion 808B may display one or more selected carpools. The carpools displayed may be based on a selection relating to the carpool search portion 806B. Carpool join portion 808B may display one or more input interfaces by which the caregiver may join a contact as a carpool as a driver and/or as a passenger. A caregiver may be join a contact as a driver and/or as a passenger in a carpool in a manner similar to that as described above with respect to carpool management module 150.

In some implementations, carpool creation portion 810B may display one or more input interfaces by which the caregiver may create a carpool. A carpool may be created in a manner similar to that as described above with respect to carpool creation module 162. For example, the caregiver may provide one or more items of carpool information via the carpool creation portion 810B, may invite one or more passengers and/or one or more drivers to the carpool, and may perform other functionality related to the creation of a carpool.

Aspects and implementations described herein as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other aspects or implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A system for event management and carpool scheduling, the system comprising:
    one or more computing devices comprising one or more physical processors configured to execute computer code, the one or more computing devices comprising:
        a first code portion for facilitating events, the first code portion configured to:
            receive event registration information;
            generate a registered event based on the event registration information, wherein the event registration information describes the registered event; and
            facilitate registration of a first participant in the registered event by a first caregiver associated with the first participant;
        a second code portion for facilitating carpools, the second code portion configured to:
            receive a request to generate a first carpool related to organizing transport to at least one first location related to the registered event;
            generate the first carpool in association with the registered event, the first carpool comprising:
                information related to one or more drivers, wherein a first driver of the one or more drivers is associated with a first subset of the one or more participants;
                information related to one or more participants of the registered event as respective one or more passengers of the first carpool; and
                a recurring carpool including a plurality of carpool instances, an individual carpool instance being associated with a single transport of a subset of the one or more passengers,
            automatically determine an individual driver from the one or more drivers for a first carpool instance based on respective number of carpool instances assigned to the one or more drivers and based on respective associations of the one or more drivers with the subset of passengers associated with the first carpool instance;
            receive a second request to generate a second carpool related to organizing transport to at least one second location related to an unregistered event that is separate from the registered event; and
            generate the second carpool, the second carpool being different from the first carpool; and
        a third code portion for facilitating calendars, the third code portion configured to:
            receive caregiver registration information for the first caregiver;
            register the first caregiver with the system;
            provide access to a calendar for the first caregiver;
            responsive to a registration of the first participant for a registered event, automatically add a schedule associated with the registered event to the calendar for the first caregiver; and
            responsive to an assignment of the first driver to the first carpool, automatically add a schedule associated with the first driver to the calendar for the first caregiver.

2. The system of claim 1, wherein the unregistered event is not associated with corresponding event registration information.

3. The system of claim 1, wherein the plurality of instances comprises the first carpool instance and a second carpool instance different from the first carpool instance, wherein the first carpool instance is associated with a first transport of passengers and the second carpool instance is associated with a second transport of passengers different from the first transport of passengers.

4. The system of claim 3, wherein the first carpool instance is associated with a first set of locations and the second carpool instance is associated with a second set of locations different from the first set of locations.

5. The system of claim 1, wherein the second code portion is configured to:
    automatically determine the individual driver for the first carpool instance further based on respective schedules of the one or more drivers.

6. The system of claim 1, wherein the computing device comprises a fourth code portion for facilitating groups, the fourth code portion configured to:
    responsive to a determination that the registered event has been registered, automatically create a first group related to the registered event, the first group comprising one or more caregivers associated with the registered event as group members;
    provide, for the first group, a forum for sharing information among group members.

7. The system of claim 6, wherein the fourth code portion is configured to:
    receive a group request to generate a second group not related to a registered event;
    generate the second group;
    facilitate invitation of one or more users to the second group as second group members; and
    provide, for the second group, a forum for sharing information among second group members.

8. A computer-implemented method for event management and carpool scheduling, the method being implemented via one or more computing devices comprising one or more physical processors configured to execute computer code, the method comprising:
    receiving, by the one or more physical processors, event registration information;
    generating, by the one or more physical processors, a registered event based on the event registration information, wherein the event registration information describes the registered event;
    facilitating, by the one or more physical processors, registration of a first participant in the registered event by a first caregiver associated with the first participant;
    receiving, by the one or more physical processors, a request to generate a first carpool related to organizing transport to at least one first location related to the registered event;
    generating, by the one or more physical processors, the first carpool in association with the registered event, the first carpool comprising:
        information related to one or more drivers, wherein a first driver of the one or more drivers is associated with a first subset of the one or more participants;

information related to one or more participants of the registered event as respective one or more passengers of the first carpool; and a recurring carpool including a plurality of carpool instances, an individual carpool instance being associated with a single transport of a subset of the one or more passengers, automatically determining, by the one or more physical processors, an individual driver from the one or more drivers for a first carpool instance based on respective number of carpool instances assigned to the one or more drivers and based on respective associations of the one or more drivers with the subset of passengers associated with the first carpool instance;

receiving, by the one or more physical processors, a second request to generate a second carpool related to organizing transport to at least one second location related to an unregistered event that is separate from the registered event;

generating, by the one or more physical processors, the second carpool, the second carpool being different from the first carpool;

receiving, by the one or more physical processors, caregiver registration information for the first caregiver;

registering, by the one or more physical processors, the first caregiver with the system;

providing, by the one or more physical processors, access to a calendar for the first caregiver;

responsive to a registration of the first participant for a registered event, automatically adding, by the one or more physical processors, a schedule associated with the registered event to the calendar for the first caregiver; and responsive to an assignment of the first driver associated with the first participant to the first carpool, automatically adding, by the one or more physical processors, a schedule associated with the first driver to the calendar for the first caregiver.

9. The method of claim 8, wherein the unregistered event is not associated with corresponding event registration information.

10. The method of claim 8, wherein the plurality of instances comprises the first carpool instance and a second carpool instance different from the first carpool instance, the first carpool instance being associated with a first transport of passengers and the second carpool instance being associated with a second transport of passengers different from the first transport of passengers.

11. The method of claim 10, the first carpool instance being associated with a first set of locations and the second carpool instance being associated with a second set of locations different from the first set of locations.

12. The method of claim 8, further comprising:
automatically determining, by the one or more physical processors, the individual driver for the first carpool instance further based on respective schedules of the one or more drivers.

13. The method of claim 8, further comprising:
responsive to a determination that the registered event has been registered, automatically creating, by the one or more physical processors, a first group related to the registered event, the first group comprising one or more caregivers associated with the registered event as group members;

providing, by the one or more physical processors, for the first group, a forum for sharing information among group members.

14. The method of claim 13, further comprising:
receiving, by the one or more physical processors, a group request to generate a second group not related to a registered event;

generating, by the one or more physical processors, the second group;

facilitating, by the one or more physical processors, invitation of one or more users to the second group as second group members; and providing, by the one or more physical processors, for the second group, a forum for sharing information among second group members.

15. A computer-implemented method for event management and carpool scheduling, the method being implemented via one or more computing devices comprising one or more physical processors configured to execute computer code, the method comprising:

receiving, by the one or more physical processors, event registration information;

generating, by the one or more physical processors, a registered event based on the event registration information, wherein the event registration information describes the registered event;

facilitating, by the one or more physical processors, registration of a first participant in the registered event by a first caregiver associated with the first participant;

receiving, by the one or more physical processors, a request to generate a first carpool related to organizing transport to at least one first location related to the registered event;

generating, by the one or more physical processors, the first carpool in association with the registered event;

receiving, by the one or more physical processors, a second request to generate a second carpool related to organizing transport to at least one second location related to an unregistered event that is separate from the registered event;

generating, by the one or more physical processors, the second carpool, the second carpool being different from the first carpool;

receiving, by the one or more physical processors, caregiver registration information for the first caregiver;

registering, by the one or more physical processors, the first caregiver with the system;

providing, by the one or more physical processors, access to a calendar for the first caregiver;

responsive to a registration of the first participant for the registered event, automatically adding, by the one or more physical processors, a schedule associated with the registered event to the calendar for the first caregiver; and responsive to an assignment of a first driver associated with the first participant to the first carpool, automatically adding, by the one or more physical processors, a schedule associated with the first driver to the calendar for the first caregiver.

16. The method of claim 15, wherein the unregistered event is not associated with corresponding event registration information.

17. The method of claim 15, wherein the second carpool comprises a recurring carpool including a plurality of carpool instances, an individual carpool instance being associated with a single transport of a plurality of passengers.

18. The method of claim 17, wherein the plurality of instances comprises a first carpool instance and a second carpool instance different from the first carpool instance, the first carpool instance being associated with a first transport of passengers and the second carpool instance being associated with a second transport of passengers different from the first transport of passengers.

19. The method of claim 17, further comprising:
storing, by the one or more physical processors, information related to one or more drivers available for the second carpool; and
automatically determining, by the one or more physical processors, an individual driver from the one or more available drivers for an individual carpool instance based on respective number of carpool instances assigned to the one or more available drivers.

20. The method of claim 19, further comprising:
storing, by the one or more physical processors, information related to a plurality of passengers to be transported by the second carpool;
associating, by the one or more physical processors, the first driver of the one or more available drivers with a first subset of passengers of the plurality of passengers; and
automatically determining, by the one or more physical processors, the individual driver from the one or more available drivers for the individual carpool instance further based on respective schedules of the one or more available drivers and based on respective associations of the one or more available drivers with one or more of the plurality of passengers associated with the individual carpool instance.

21. The method of claim 15, further comprising:
responsive to a determination that the registered event has been registered, automatically creating, by the one or more physical processors, a first group related to the registered event, the first group comprising one or more caregivers associated with the registered event as group members;
providing, by the one or more physical processors, for the first group, a forum for sharing information among group members.

22. A system for event management and carpool scheduling, the system comprising:
one or more computing devices comprising one or more physical processors configured to execute computer code, the one or more computing devices comprising:
a first code portion for facilitating events, the first code portion configured to:
receive registration information;
generate a registered event based on the registration information, wherein the event registration information describes the registered event; and
facilitate registration of a first participant in the registered event by a first caregiver associated with the first participant; and
a second code portion for facilitating carpools, the second code portion configured to:
receive a request to generate a first carpool related to organizing transport to at least one first location related to the registered event; and
receive a second request to generate a second carpool related to organizing transport at least one second location related to an unregistered event that is separate from the registered event; and
generate the first carpool in association with the registered event; and
generate the second carpool, the second carpool being different from the first carpool; and
a third code portion for facilitating calendars, the third code portion configured to:
receive caregiver registration information for the first caregiver;
register the first caregiver with the system;
provide access to a calendar for the first caregiver;
responsive to a registration of the first participant for the registered event, automatically add a schedule associated with the registered event to the calendar for the caregiver; and
responsive to an assignment of a first driver associated with the first participant to the first carpool, automatically add a schedule associated with the first driver to the calendar for the first caregiver.

23. The system of claim 22, wherein the unregistered event is not associated with corresponding event registration information.

24. The system of claim 22, wherein the first carpool comprises a recurring carpool including a plurality of carpool instances, an individual carpool instance being associated with a single transport of passengers, and
wherein the second code portion is configured to:
store information related to one or more drivers available for the first carpool; and
automatically determine an individual driver from the one or more available drivers for an individual carpool instance based on respective number of carpool instances assigned to the one or more available drivers.

25. The system of claim 24, wherein the second code portion is configured to:
store information related to a plurality of passengers to be transported by the first carpool;
associate the first driver of the one or more available drivers with a first subset of passengers of the plurality of passengers; and
automatically determine the individual driver from the one or more available drivers for the individual carpool instance further based on respective schedules of the one or more available drivers and based on respective associations of the one or more available drivers with one or more of the plurality of passengers associated with the individual carpool instance.

26. The system of claim 25, wherein the plurality of instances comprises a first carpool instance and a second carpool instance different from the first carpool instance, the first carpool instance being associated with a first transport of passengers and the second carpool instance being associated with a second transport of passengers different from the first transport of passengers.

27. The system of claim 22, wherein the computing device comprises a fourth code portion for facilitating groups, the fourth code portion configured to:
responsive to a determination that the registered event has been registered, automatically create a first group related to the registered event, the first group comprising one or more caregivers associated with the registered event as group members;
provide, for the first group, a forum for sharing information among group members.

28. The system of claim 27, wherein the fourth code portion is configured to:
receive a group request to generate a second group not related to a registered event;
generate the second group;
facilitate invitation of one or more users to the second group as second group members; and provide, for the second group, a forum for sharing information among second group members.

\* \* \* \* \*